US012784019B2

(12) United States Patent
Mattison et al.

(10) Patent No.: US 12,784,019 B2
(45) Date of Patent: Nov. 3, 2026

(54) UNIVERSAL SELF-SERVICE KIOSK PLATFORM

(71) Applicant: Bank of America Corporation, Charlotte, NC (US)

(72) Inventors: Paul Mattison, Sherrills Ford, NC (US); Jinna Kim, Charlotte, NC (US); Timothy Scott Murphy, Charlotte, NC (US); Matthew Williams, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 18/135,834

(22) Filed: Apr. 18, 2023

(65) Prior Publication Data

US 2024/0354729 A1 Oct. 24, 2024

(51) Int. Cl.
*G06Q 20/18* (2012.01)
*G06Q 20/10* (2012.01)

(52) U.S. Cl.
CPC ........... *G06Q 20/18* (2013.01); *G06Q 20/108* (2013.01)

(58) Field of Classification Search
CPC ... G06Q 20/18; G06Q 20/108; G06Q 20/1085
See application file for complete search history.

(56) References Cited

U.S. PATENT DOCUMENTS 6,195,694 B1 * 2/2001 Chen .................. G07F 17/0014 709/204
7,209,964 B2 4/2007 Dugan et al.
7,852,817 B2 12/2010 Gallagher et al.
(Continued)

FOREIGN PATENT DOCUMENTS

AU 2017101240 A4 * 11/2017
CA 2475405 A1 * 12/2005 ............ G06Q 10/10
(Continued)

OTHER PUBLICATIONS

Diebold to Expand ATM Services. (2000). Credit Union Journal, 4(50), 9. (Year: 2000).*

*Primary Examiner* — Ashford S Hayles
(74) *Attorney, Agent, or Firm* — Banner & Witcoff, Ltd.

(57) ABSTRACT

Arrangements for a universal self-service kiosk platform are provided. In some aspects, registration data may be received from a plurality of enterprise organizations and may include self-service kiosk configuration data for each enterprise organization. A request to associate a self-service kiosk with a first enterprise organization may be received and may include identification of the first enterprise organization and the self-service kiosk. In response, a self-service kiosk configuration associated with the first enterprise organization may be retrieved and an instruction causing the self-service kiosk to implement the self-service kiosk configuration associated with the first enterprise organization may be generated. The instruction may be transmitted to the self-service kiosk. Transmitting the instruction to the self-service kiosk may cause the self-service kiosk to modify a current configuration including, for instance, modifying a display, modifying functionality provided, and the like, based on the self-service kiosk configuration associated with the first enterprise organization.

21 Claims, 15 Drawing Sheets

(56) References Cited

U.S. PATENT DOCUMENTS

| | | | | |
|---|---|---|---|---|
| 8,020,757 | B2 * | 9/2011 | Gardner | G07F 19/20 705/40 |
| 8,560,366 | B2 | 10/2013 | Mikurak | |
| 8,886,557 | B2 * | 11/2014 | Shahbazi | G06Q 20/10 705/16 |
| 9,310,880 | B2 * | 4/2016 | Inderrieden | G06Q 10/10 |
| 9,389,873 | B2 * | 7/2016 | Kuscher | G06F 8/65 |
| 9,916,567 | B1 * | 3/2018 | Baar | G06Q 20/30 |
| 10,078,824 | B2 * | 9/2018 | Edwards | G06Q 30/06 |
| 10,938,784 | B2 * | 3/2021 | Patterson | H04L 67/131 |
| 2001/0024164 | A1 * | 9/2001 | Kawamura | H04L 69/18 340/3.9 |
| 2002/0032656 | A1 * | 3/2002 | Chen | G07F 19/211 705/43 |
| 2002/0116335 | A1 * | 8/2002 | Star | G06Q 20/00 705/42 |
| 2002/0138548 | A1 * | 9/2002 | Neebe | G07F 9/002 709/201 |
| 2002/0184258 | A1 * | 12/2002 | Korala | G06F 16/40 715/205 |
| 2004/0193867 | A1 * | 9/2004 | Zimmer | G06F 9/4416 713/2 |
| 2006/0000903 | A1 * | 1/2006 | Barry | G06Q 30/02 235/385 |
| 2006/0041651 | A1 * | 2/2006 | Walcutt | G06Q 10/10 709/223 |
| 2006/0085236 | A1 * | 4/2006 | Smith | G06Q 10/06 705/35 |
| 2007/0118437 | A1 * | 5/2007 | Perrault | G06Q 50/16 705/27.1 |
| 2007/0235533 | A1 * | 10/2007 | Giordano | G06Q 20/18 235/383 |
| 2008/0010375 | A1 * | 1/2008 | Coleman | H04L 63/029 709/225 |
| 2008/0163172 | A1 * | 7/2008 | Rossmann | G06F 8/656 717/121 |
| 2008/0276258 | A1 * | 11/2008 | Liu | G06F 9/45537 718/1 |
| 2009/0032579 | A1 * | 2/2009 | Gardner | G06Q 20/042 235/379 |
| 2009/0076934 | A1 * | 3/2009 | Shahbazi | G06Q 40/02 705/40 |
| 2009/0265273 | A1 * | 10/2009 | Guntupalli | G07F 19/203 705/44 |
| 2011/0078637 | A1 * | 3/2011 | Inderrieden | G06Q 10/10 715/866 |
| 2012/0011540 | A1 * | 1/2012 | Pulford | G06Q 10/40 715/753 |
| 2012/0096521 | A1 * | 4/2012 | Peddada | H04L 41/28 726/4 |
| 2012/0110311 | A1 * | 5/2012 | Kobres | G06Q 30/02 713/2 |
| 2012/0324069 | A1 * | 12/2012 | Nori | G06F 9/5066 709/222 |
| 2013/0036049 | A1 * | 2/2013 | Cacheria, III | G06Q 10/1053 705/42 |
| 2013/0097077 | A1 * | 4/2013 | Bachrany | G06Q 40/02 705/43 |
| 2014/0129439 | A1 * | 5/2014 | Suisa | G06Q 40/02 705/42 |
| 2014/0172602 | A1 * | 6/2014 | Beddow | G06Q 20/123 705/21 |
| 2014/0337611 | A1 * | 11/2014 | Kuscher | G06F 21/57 348/14.07 |
| 2014/0351623 | A1 * | 11/2014 | Baird | G06F 11/1484 714/4.11 |
| 2015/0046325 | A1 * | 2/2015 | McCracken | G06F 9/452 705/43 |
| 2015/0120463 | A1 * | 4/2015 | Cannon | G06Q 30/0268 705/14.65 |
| 2016/0034871 | A1 * | 2/2016 | Vargas | G06Q 20/1085 705/43 |
| 2016/0078437 | A1 * | 3/2016 | Tahon | G06Q 20/20 705/77 |
| 2017/0208131 | A1 * | 7/2017 | Dersy | H04L 12/4641 |
| 2018/0101392 | A1 * | 4/2018 | Chew | G06F 9/4406 |
| 2018/0232716 | A1 * | 8/2018 | Conforti | G06Q 30/0639 |
| 2020/0019993 | A1 | 1/2020 | Polo | |
| 2020/0021585 | A1 * | 1/2020 | Magadevan | H04W 12/37 |
| 2020/0104814 | A1 * | 4/2020 | Gugsa | G06Q 20/1085 |
| 2020/0117779 | A1 * | 4/2020 | Jain | H04L 63/0861 |
| 2020/0302506 | A1 * | 9/2020 | Parker | G06Q 30/0631 |
| 2020/0374351 | A1 * | 11/2020 | Momchilov | G06F 9/452 |
| 2021/0034377 | A1 * | 2/2021 | Martin | G06F 9/44505 |
| 2021/0118038 | A1 * | 4/2021 | Schmidt | G06T 11/00 |
| 2021/0240466 | A1 * | 8/2021 | Sun | H04L 67/34 |
| 2022/0114007 | A1 * | 4/2022 | Korala | G06F 9/45533 |
| 2022/0191186 | A1 * | 6/2022 | Chandramohan | H04L 67/145 |
| 2023/0074782 | A1 * | 3/2023 | Tendulkar | A45D 44/005 |
| 2023/0316847 | A1 * | 10/2023 | Khatter | G06Q 20/18 700/231 |
| 2024/0086834 | A1 * | 3/2024 | Asher | G06Q 30/0641 |

FOREIGN PATENT DOCUMENTS

| | | | | | |
|---|---|---|---|---|---|
| CA | 2623647 | A1 | * | 3/2007 | G06Q 20/40 |
| CA | 2799242 | A1 | * | 6/2013 | H04L 67/51 |
| CN | 103839334 | A | * | 6/2014 | |
| CZ | 319299 | A3 | * | 1/2000 | |
| EP | 3376387 | A1 | | 9/2018 | |
| ES | 2708805 | T3 | * | 4/2019 | G06Q 20/3829 |
| IN | 202011007303 | A | * | 2/2020 | |
| KR | 20130125992 | A | * | 11/2013 | G06Q 20/18 |
| KR | 20220116764 | A | * | 8/2022 | G06Q 30/0633 |
| KR | 20220144235 | A | * | 10/2022 | G06F 3/0412 |
| WO | WO-2010002400 | A1 | * | 1/2010 | G06F 9/5072 |
| WO | WO-2014085352 | A1 | * | 6/2014 | A61B 3/18 |
| WO | WO-2021162434 | A1 | * | 8/2021 | G06Q 20/308 |
| WO | WO-2021192375 | A1 | * | 9/2021 | G07D 11/20 |
| WO | WO-2023283043 | A1 | * | 1/2023 | G06Q 30/0621 |

* cited by examiner

UNIVERSAL SELF-SERVICE KIOSK PLATFORM

BACKGROUND

Aspects of the disclosure relate to electrical computers, systems, and devices for providing a universal self-service kiosk platform.

Currently, financial institutions generally own, operate and/or maintain self-service kiosks to provide functionality to customers. However, costs to maintain and operate self-service kiosks can be expensive. Further, providing self-service kiosk in a variety of geographic areas can be costly and inefficient. In addition, conventional self-service kiosks do not provide intelligent recommendation capability and, instead, rely on standard functionality to provide to users. Accordingly, it would be advantageous to provide a universal self-service kiosk platform that can associate one or more self-service kiosks with different financial institutions and provide dynamic, intelligent recommendations.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with maintaining self-service kiosks.

In some aspects, registration data may be received from a plurality of enterprise organizations, such as financial institutions, vendors, retailers, and the like. The registration data may include self-service kiosk configuration data for each enterprise organization. In some examples, a request to associate at least one self-service kiosk with a first enterprise organization may be received. The request may include identification of the first enterprise organization and the at least one self-service kiosk.

In response to receiving the request, a self-service kiosk configuration associated with the first enterprise organization may be retrieved. For instance, the self-service kiosk configuration associated with the first enterprise organization and received with, for instance, the registration data may be retrieved. In some examples, an instruction causing the at least one self-service kiosk to implement the self-service kiosk configuration associated with the first enterprise organization may be generated. The instruction may be transmitted to the at least one self-service kiosk. In some examples, transmitting the instruction to the at least one self-service kiosk may cause the at least one self-service kiosk to modify a current configuration. In some examples, modifying the current configuration may include modifying a display, modifying functionality provided, and the like, based on the self-service kiosk configuration associated with the first enterprise organization.

In some examples, a user may request transaction process at the at least one self-service kiosk. In response, the requested transaction may be routed to the first enterprise organization for authorization and/or processing. An instruction causing the at least one self-service kiosk to approve or deny the transaction may be generated and transmitted to the at least one self-service kiosk.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
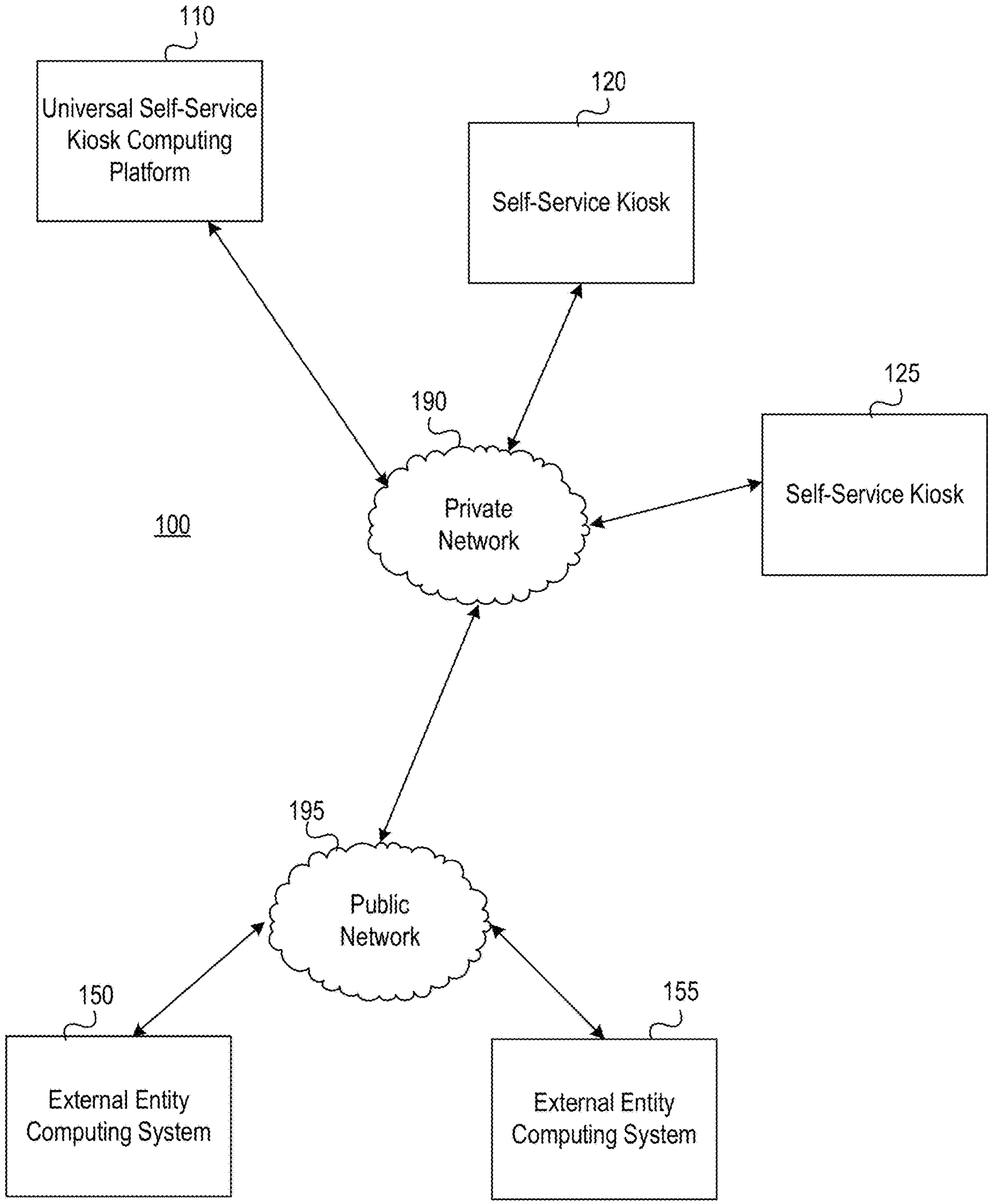
FIGS. 1A and 1B depict an illustrative computing environment for implementing universal self-service kiosk functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, maintaining self-service kiosks in many locations can be costly and inefficient for financial institutions. Further, conventional self-service kiosks provide static offerings and do not include intelligent recommendations. Accordingly, as discussed more fully herein, a universal self-service kiosk platform is provided to associate self-service kiosk(s) with different enterprise organizations, such as financial institutions, vendors, retailers, and the like, to leverage hardware across multiple entities. In some examples, one self-service kiosk may be associated with an enterprise organization. Additionally or alternatively, a plurality of self-service kiosks may be associated with the enterprise organization.

In some examples, the association may last for a predetermined time period (e.g., 4 hours, one day, one week, or the like) and after that time the self-service kiosk may revert back to association with the owner enterprise organization and revert to the default functionality and displays of that enterprise organization. Additionally or alternatively, the association may remain in place until a different enterprise organization requests association with that self-service kiosk.

In some examples, association of an enterprise organization with a self-service kiosk may cause the self-service kiosk to appear to be "owned" or maintained or otherwise controlled by the enterprise organization. For instance, logos or other branding of the enterprise organization may be displayed during the time that the self-service kiosk is associated with the enterprise organization. Further, user interfaces, functionality, and the like, may be based on configuration information of the enterprise organization, further providing the appearance that the self-service kiosk is owned, maintained or otherwise controlled by the enterprise organization.

Accordingly, the universal self-service kiosk platform described herein may receive requests to associate one or more self-service kiosks with an enterprise organization (e.g., an enterprise organization different from the enterprise organization implementing the universal self-service kiosk platform and who may, in some examples, own, maintain and/or otherwise control the one or more self-service kiosks. In response, the universal self-service kiosk may retrieve a self-service kiosk configuration associated with the enterprise organization and may generate an instruction causing the one or more self-service kiosks to implement or execute the self-service configuration. The instruction may be transmitted to the one or more self-service kiosks and may cause the one or more self-service kiosks to modify one or more display, functionality provided, or the like, based on the self-service kiosk configuration of the associated enterprise organization.

In some examples, as transaction requests are received from the one or more self-service kiosks, the requests may be routed to a host system associated with the enterprise organization for approval and/or processing.

These and various other arrangements will be discussed more fully below.

Figure 1B:
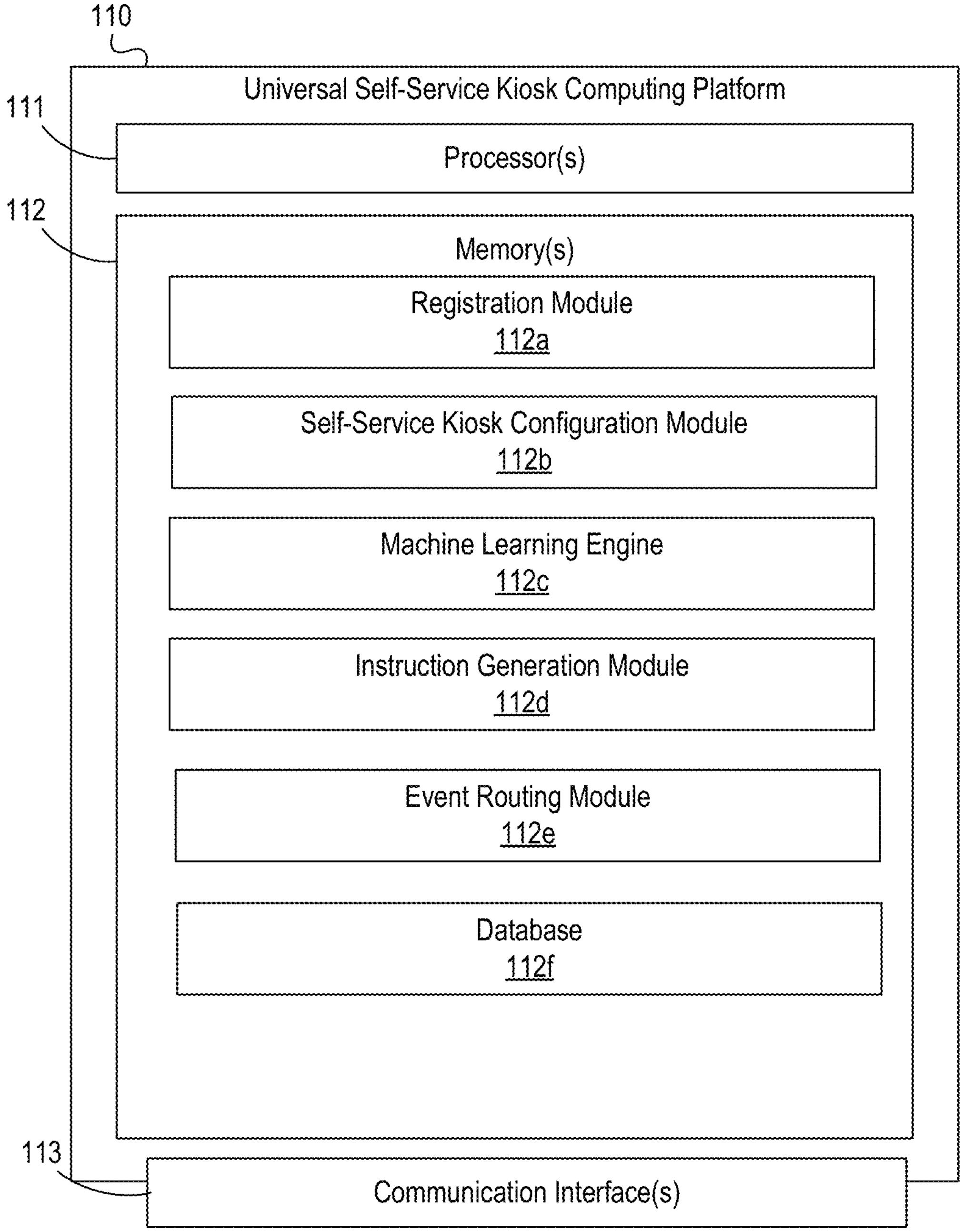

Aspects described herein may be implemented using one or more computing devices operating in a computing environment. For instance, FIGS. 1A-1B depict an illustrative computing environment for implementing a universal self-service kiosk platform in accordance with one or more aspects described herein. Referring to FIG. 1A, computing environment 100 may include one or more computing devices and/or other computing systems. For example, computing environment 100 may include universal self-service kiosk computing platform 110, self-service kiosk 120, self-service kiosk 125, external entity computing system 150, and/or external entity computing system 155. Although two self-service kiosks 120, 125 and two external entity computing systems 150, 155 are shown, any number of systems or devices may be used without departing from the invention.

Universal self-service kiosk computing platform 110 may be configured to provide intelligent, dynamic and efficient modification of one or more self-service kiosks based on a specification or parameters of a selected enterprise organization. For instance, universal self-service kiosk computing platform 110 may receive a request to modify one or more self-service kiosks to appear associated with a first enterprise organization. In some examples, the request maybe received from a user of the self-service kiosk (e.g., a user may select an enterprise organization to associated with the self-service kiosk from, for instance, display screen on the self-service kiosk). Additionally or alternatively, an enterprise organization, such as a financial institution, retailer, or the like, may request that one or more self-service kiosks be associated with the requesting enterprise organization.

Responsive to receiving the request, universal self-service kiosk computing platform 110 may retrieve specifications or parameters associated with the enterprise organization. For instance, an enterprise organization may have particular functionality that should be provided to a user via the self-service kiosk. In some examples, the enterprise organization may have particular user interfaces, may present options in a particular format or order, or the like. These specifications or parameters may be retrieved and used to generate an instruction to command causing the self-service kiosk to modify a display, functionality, or the like.

In some examples, universal self-service kiosk computing platform 110 may execute a machine learning model to identify one or more additional functions to provide, recommendations to provide, or the like. For instance, a machine learning model may be trained using, for instance, historical user data. The machine learning model may receive, as inputs, a location of the self-service kiosk, historical transaction data, and the like, to generate, as outputs, one or more recommendations or offers for a user (e.g., an additional function not typically offered by the enterprise organization, a discount or coupon for a local retailer, or the like).

In some arrangements, universal self-service kiosk computing platform 110 may transmit or send the generated instruction and any generated recommendations to the self-service kiosk. Transmitting or sending the instruction and/or recommendation may cause the self-service kiosk to modify a display (e.g., based on specifications associated with the enterprise organization), modify functionality offered, and the like. In some examples, the self-service kiosk may automatically execute the modifications based on receiving the instruction or command.

In some examples, a user may then request a transaction at the modified self-service kiosk. The requested transaction may be received by the universal self-service kiosk computing platform 110 and routed to a host system or server associated with the enterprise organization for authentication, processing, and the like. Response data may be received by the universal self-service kiosk computing platform 110 from the enterprise organization and one or more notifications may be generated and transmitted to the self-service kiosk. Once the transaction is complete, the self-service kiosk may remain in the modified state until a request to associate the self-service kiosk with a second, different enterprise organization is received, until a predetermined time period has elapsed, or the like.

Self-service kiosk 120 and/or self-service kiosk 125 may be or include one or more computing devices (e.g., servers, server blades, or the like) and/or one or more computing components (e.g., memory, processor, and the like) and may be configured to receive and process transaction requests (e.g., cash withdrawals, balance transfers, deposits, or the like). Self-service kiosk 120 and/or self-service kiosk 125 may include automated teller machines (ATMs), automated teller assistants (ATAs), self-service point-of-sale systems, or the like. Self-service kiosk 120 and/or self-service kiosk 125 may be configured to modify displays, functionality, and the like, based on instructions or commands received from the universal self-service kiosk computing platform 110. In some examples, the self-service kiosks 120, 125 may be associated with a first enterprise organization, such as a financial institution, and may be connected via a private network of the first enterprise organization. Additionally or alternatively, one or more of self-service kiosk 120 and/or self-service kiosk 125 may be associated with another, different entity and may be connected via a public network.

External entity computing system 150 and/or external entity computing system 155 may be or include or more computing devices (e.g., servers, server blades, or the like) and/or one or more computing components (e.g., memory, processor, and the like) and may be configured to host one or more transaction processing systems, applications, and the like, associated with a respective enterprise organization. For instance, external entity computing system 150 may be associated with an enterprise organization and external entity computing system 155 may be associated with a different enterprise organization. Each of these enterprise organizations may be registered with universal self-service kiosk computing platform 110 and may process transaction requests received from self-service kiosk 120, self-service kiosk 125, or the like, when the self-service kiosk is modified according to specifications or parameters of the respective enterprise organization.

As mentioned above, computing environment 100 also may include one or more networks, which may interconnect one or more of universal self-service kiosk computing platform 110, self-service kiosk 120, self-service kiosk 125, external entity computing system 150, and/or external entity computing system 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, universal self-service kiosk computing platform 110, self-service kiosk 120, and/or self-service kiosk 125, may be associated with an enterprise organization (e.g., a financial institution), and private network 190 may be associated with and/or operated by the organization, and may include one or more networks (e.g., LANs, WANs, virtual private networks (VPNs), or the like) that interconnect universal self-service kiosk computing platform 110, self-service kiosk 120, and/or self-service kiosk 125, and one or more other computing devices and/or computer systems that are used by, operated by, and/or otherwise associated with the organization. Public network 195 may connect private network 190 and/or one or more computing devices connected thereto (e.g., universal self-service kiosk computing platform 110, self-service kiosk 120, and/or self-service kiosk 125) with one or more networks and/or computing devices that are not associated with the organization. For example, external entity computing system 150 and/or external entity computing system 155 might not be associated with an organization that operates private network 190 (e.g., because external entity computing system 150 and/or external entity computing system 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150 and/or external entity computing system 155 to private network 190 and/or one or more computing devices connected thereto (e.g., universal self-service kiosk computing platform 110, self-service kiosk 120, and/or self-service kiosk 125).

Referring to FIG. 1B, universal self-service kiosk computing platform 110 may include one or more processors 111, memory 112, and communication interface 113. A data bus may interconnect processor(s) 111, memory 112, and communication interface 113. Communication interface 113 may be a network interface configured to support communication between universal self-service kiosk computing platform 110 and one or more networks (e.g., network 190, network 195, or the like). Memory 112 may include one or more program modules having instructions that when executed by processor(s) 111 cause universal self-service kiosk computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of universal self-service kiosk computing platform 110 and/or by different computing devices that may form and/or otherwise make up universal self-service kiosk computing platform 110.

For example, memory 112 may have, store and/or include registration module 112*a*. Registration module 112*a* may store instructions and/or data that may cause or enable the universal self-service kiosk computing platform 110 to receive, from a plurality of enterprise organizations, registration data. For instance, enterprise organizations opting in to the universal self-service kiosk arrangements described herein may provide enterprise organization identifying data (e.g., name, logo, and the like), as well as specifications for modifying one or more self-service kiosks to appear associated with a respective enterprise organization, such as user interfaces to display, functionality or options to provide, arrangement or options on a display, or the like. The registration data may be stored (e.g., in database 112*f*) and retrieved in response to a request to modify a self-service kiosk to appear associated with a respective enterprise organization.

Universal self-service kiosk computing platform 110 may further have, store and/or include self-service kiosk configuration module 112*b*. Self-service kiosk configuration module 112*b* may store instructions and/or data that may cause or enable the universal self-service kiosk computing platform 110 to receive a request to modify one or more self-service kiosks to appear associated with a particular enterprise organization. The requests may be received from a user (e.g., a user selects an enterprise organization for association from a display providing a plurality of enterprise organizations available for selection) and/or from an enterprise organization. The request may be to modify a single self-service kiosk or a plurality of self-service kiosks (e.g., self-service kiosks within a location or area, within a predefined distance of a location or event, within a geo-fenced area, or the like).

Self-service kiosk configuration module 112*b* may receive the requests and process the requests to retrieve specifications associated with a selected enterprise organization. For instance, self-service kiosk configuration module 112*b* may retrieve (e.g., from database 112*f*) specifications, parameters, or other configuration data associated with the selected or requesting enterprise organization. The retrieved specifications may then be used (e.g., by instruction generation module 112*e*) to generate an instruction causing the one or more self-service kiosks to be modified.

Universal self-service kiosk computing platform 110 may further have, store and/or include a machine learning engine 112*c*. Machine learning engine 112*c* may store instructions and/or data that may cause or enable the universal self-service kiosk computing platform 110 to train, execute, validate and/or update one or more machine learning models that may be used to determine additional functionality to provide to a user, an offer for a user (e.g., a discount or coupon for a local retailer), an option to make a charitable donation, or the like. In some examples, the machine learning model may be trained (e.g., using historical data related to user transactions, purchase data (e.g., anonymized and/or with permissions), transaction data associated with one or more events, and the like) to identify patterns or sequences in data that may indicate an appropriate function to provide to a user, a recommendation to provide to a user, or the like. The machine learning model may, in some arrangements, use as inputs the location of the self-service kiosk, known event data (e.g., based on location), user preferences or profile data if known, enterprise organization functions provided, and the like, and, based on execution of the model, output one or more additional functions to offer to a user, recommendations to offer, or the like. User selection of an additional function or acceptance of an offer may be received by the universal self-service kiosk computing platform 110 (e.g., via a feedback loop) to update, validate or further train the machine learning model. Accordingly, the model may be continuously or near continuously updated or validated to continue to improve accuracy.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Universal self-service kiosk computing platform 110 may further have, store, and/or include instruction generation module 112*d*. Instruction generation module 112*d* may store instructions and/or data that may cause or enable the universal self-service kiosk computing platform 110 to generate one or more instructions or commands causing modification of one or more self-service kiosks. For instance, based on the retrieved enterprise organization specification and/or configuration, and any generated additional functions or recommendations output by the machine learning model, an instruction may be generated and transmitted to the one or more self-service kiosks. The instruction, when executed, may cause the receiving self-service kiosk to modify a display, functionality, or the like, based on the specifications and/or configuration. In some examples, the instruction may cause the enterprise organization logo to appear on the self-service kiosk, may cause a home screen of the enterprise organization to be displayed, may cause certain functionality to be offered, and the like (e.g., to give the appearance that the self-service kiosk is associated with the enterprise organization).

Universal self-service kiosk computing platform 110 may further have, store and/or include event routing module 112*e*. Event routing module 112*e* may store instructions and/or data that may cause or enable the universal self-service kiosk computing platform 110 to receive, from a modified self-service kiosk, a request to process a transaction and route the transaction to a host system associated with the enterprise organization with which the self-service kiosk appears to be associated. For instance, a request to process a transaction may be routed to an external entity computing system (e.g., external entity computing system 150) associated with the enterprise organization currently associated with the self-service kiosk.

Universal self-service kiosk computing platform 110 may further have, store and/or include database 112*f*. Database 112*f* may store data for use in training, executing or updating a machine learning model, data associated with enterprise organization self-service kiosk specifications or configurations, and/or other data used by the universal self-service kiosk computing platform 110.

FIGS. 2A-2J depict one example illustrative event sequence for implementing universal self-service kiosk functions in accordance with one or more aspects described herein. The events shown in the illustrative event sequence are merely one example sequence and additional events may be added, or events may be omitted, without departing from the invention. Further, one or more processes discussed with respect to FIGS. 2A-2J may be performed in real-time or near real-time.

Figure 2A:
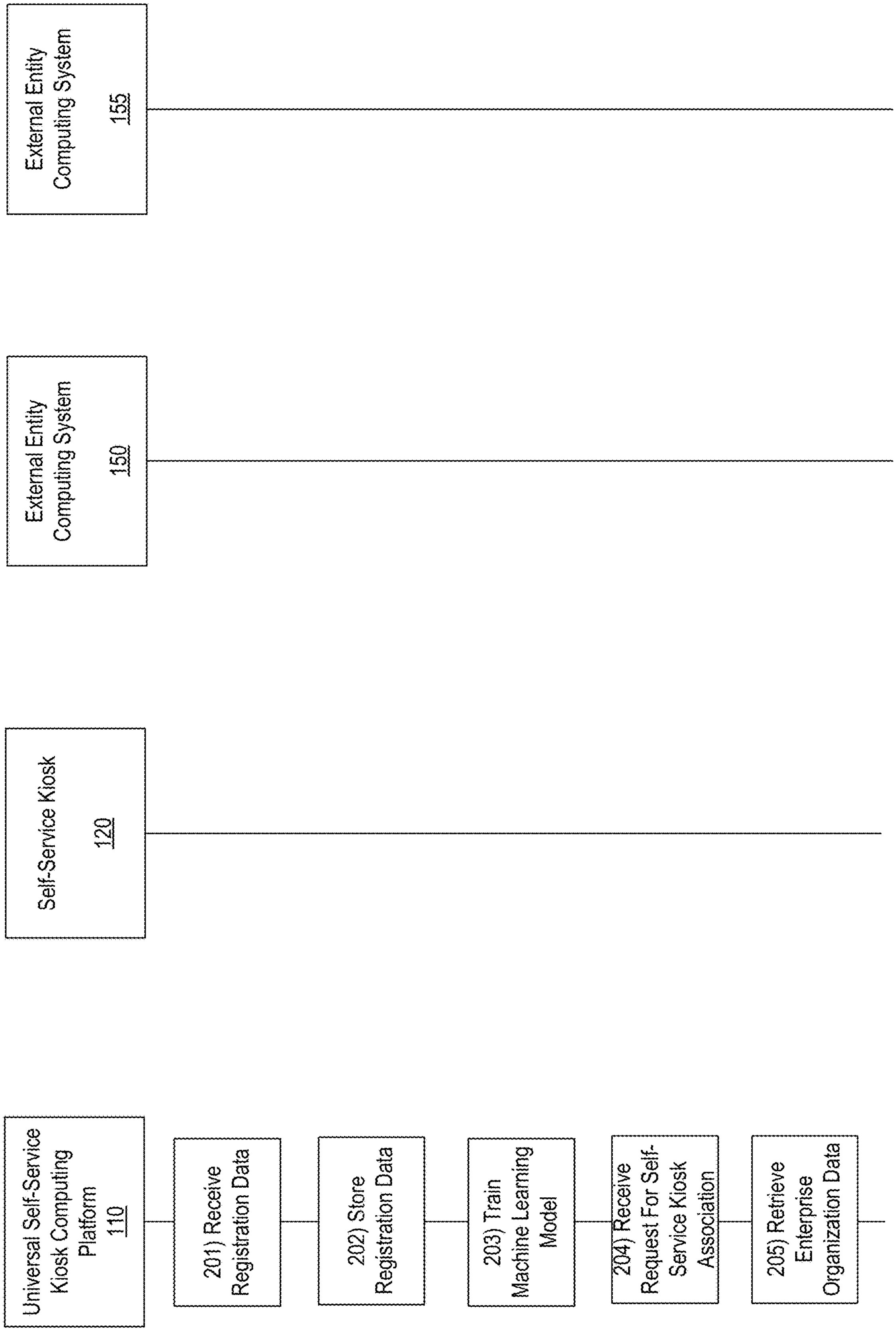
FIGS. 2A-2J depict an illustrative event sequence for implementing universal self-service kiosk functions in accordance with one or more aspects described herein.

With reference to FIG. 2A, at step 201, universal self-service kiosk computing platform 110 may receive registration data. For instance, universal self-service kiosk computing platform 110 may receive registration data from a plurality of enterprise organizations opting in to the universal self-service kiosk arrangements described herein. Registration data may include enterprise organization identifying data, logo data, specifications, parameters or configurations for a self-service kiosk including, for instance, self-service kiosk functionality data, user interfaces, and the like.

At step 202, the universal self-service kiosk computing platform 110 may store the received registration data. For instance, the specifications, parameters and/or configurations associated with each registered enterprise organization may be stored in a database (e.g., database 112*f*). The data may then be retrieved from the database to generate instructions to configure the self-service kiosk.

At step 203, universal self-service kiosk computing platform 110 may train a machine learning model. For instance, universal self-service kiosk computing platform 110 may receive historical data associated with transactions, purchases, historical entertainment data (e.g., transactions associated with entertainment events such as concerts, sporting events, and the like, as well as location history associated with transactions), and the like, and may train a machine learning model to output recommendations, functionality, or the like, for users of a self-service kiosk.

At step 204, universal self-service kiosk computing platform 110 may receive a request to associate one or more self-service kiosks with a first enterprise organization different from the enterprise organization implementing the universal self-service kiosk computing platform 110 (e.g., who may own or operate the self-service kiosk requested for association). In some examples, the request may be received from a user of a self-service kiosk, such as self-service kiosk 120. The user may be prompted with a home screen to select an enterprise organization to associate with the self-service kiosk (e.g., the user may select a financial institution at which the user has accounts). Additionally or alternatively, the first enterprise organization may request to associate with one or more self-service kiosks (e.g., a particular self-service kiosk, a group of self-service kiosks in a geographic area, or the like).

At step 205, universal self-service kiosk computing platform 110 may, based on the received request to associate the first enterprise organization with the self-service kiosk 120, retrieve specifications and/or configuration data associated with the first enterprise organization and stored by the universal self-service kiosk computing platform 110. The retrieved specifications and/or configurations may include functionality to offer, user interfaces to display, order of screens to present, or the like.

Figure 2B:
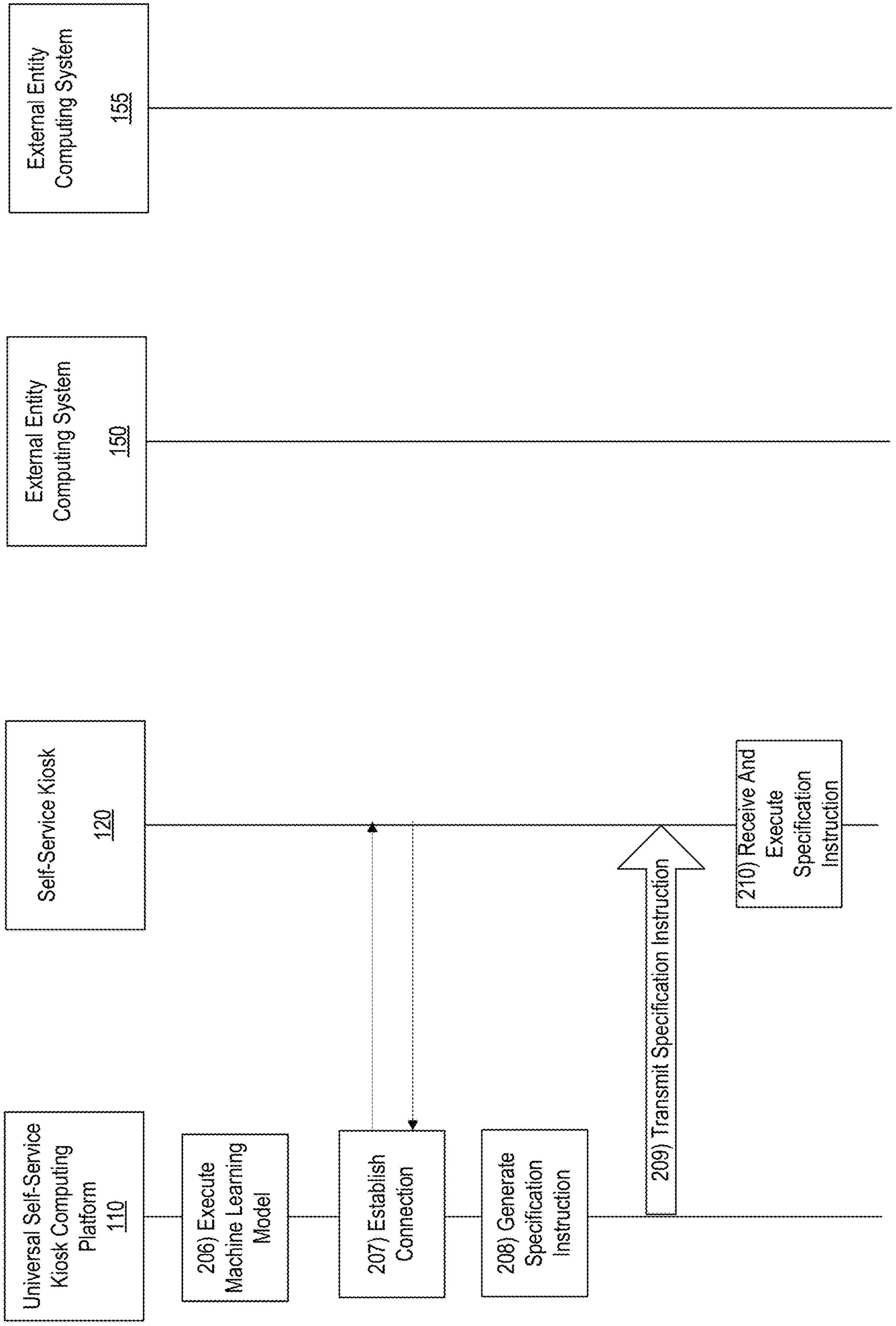

With reference to FIG. 2B, at step 206, universal self-service kiosk computing platform 110 may execute the machine learning model. For instance, universal self-service kiosk computing platform 110 may input, to the machine learning model, user data, location data of the self-service kiosk being associated, first enterprise organization data, publicly available entertainment event data (e.g., sporting events, concerts, theater performances, and the like) and, based on execution of the machine learning model, may output one or more recommended additional functions to offer to the user, one or more discounts or coupons, or the like. For example, a location near an event center might prompt a discount offer for vendors at the event center, particularly on a date in which the event center is in use, or the like.

At step 207, universal self-service kiosk computing platform 110 may connect self-service kiosk 120. For instance, a first wireless connection may be established between universal self-service kiosk computing platform 110 and self-service kiosk 120. Upon establishing the first wireless connection, a communication session may be initiated between universal self-service kiosk computing platform 110 and self-service kiosk 120.

Although a connection to one self-service kiosk 120 is shown, connections to one or more additional self-service kiosks identified for association with the first enterprise organization may be established.

At step 208, universal self-service kiosk computing platform 110 may generate an instruction causing the self-service kiosk 120 to modify display, functionality, and the like, according to the specifications and/or configuration associated with the first enterprise organization. In some examples, the instruction may include any recommended additional functions or offers output by the machine learning model.

At step 209, the generated instruction may be transmitted to the self-service kiosk 120. For instance, the instruction may be transmitted or sent during the communication session initiated upon establishing the first wireless connection.

Figure 4:
FIGS. 4 and 5 illustrate example user interfaces that may be generated in accordance with one or more aspects described herein.

At step 210, self-service kiosk 120 may receive and execute the instruction. For instance, executing the instruction may cause the self-service kiosk to modify one or more displays, functionality offered, or the like. For instance, executing the instruction may cause the self-service kiosk to display a name of the first enterprise organization, a logo of the first enterprise organization, functionality offered by the first enterprise organization, and the like, based on the specifications and/or configurations of the first enterprise organization. FIG. 4 illustrates one example user interface 400 that may be displayed. The display may include functionality specified by the first enterprise organization and/or additional functions output by the machine learning model. The logo and name of the first enterprise organization may be provided, as well as the layout may be modified based on specifications or configurations of the first enterprise organization.

In some arrangements, providing functionality selected or identified by the first enterprise organization (e.g., via a self-service kiosk configuration or parameters provided during the registration process), may include providing, activating or the like, one or more application packages configured to provide different types of functionality. For instance, functionality associated with the first enterprise organization may require a first application package, while functionality associated with a second enterprise organization may require a second application package to provide the functionality. The application packages, if downloaded to the selected self-service kiosk, may be activated, enabled or initiated by the self-service kiosk 120 based on the received and executed instruction. If the application package is not downloaded to the self-service kiosk 120, the universal self-service kiosk computing platform 110 may provide the application package to the self-service kiosk 120 (e.g., may cause the application package to be downloaded from, for example, a cloud computing environment to the self-service kiosk 120). In some examples, an adjunct switch may be used to reconfigure a self-service kiosk to provide the functionality identified by the associated enterprise organization.

In some examples, the additional functions and/or offers generated by the machine learning model may also be displayed or offered to a user upon execution of the instruction by the self-service kiosk. In some examples, the instruction may be automatically executed upon receipt by the self-service kiosk 120.

Figure 2C:
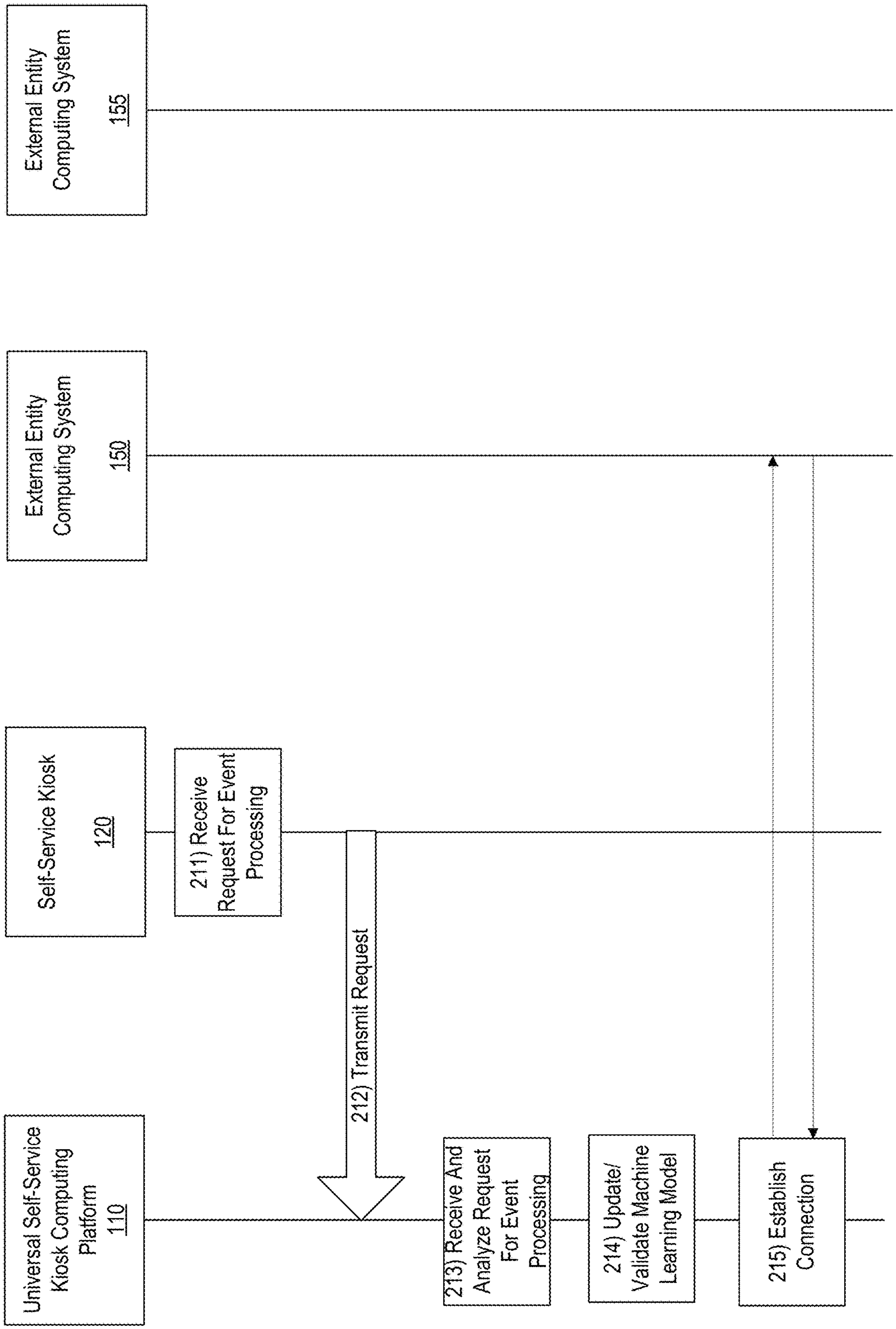

With reference to FIG. 2C, at step 211, self-service kiosk 120 may receive a request for event or transaction processing. For instance, a user may initiate a transaction at the self-service kiosk 120 that has been modified to be associated with the first enterprise organization.

At step 212, self-service kiosk 120 may transmit or send the request to process the transaction or event to the universal self-service kiosk computing platform 110. At step 213, universal self-service kiosk computing platform 110 may receive and process the requested event or transaction. For instance, the universal self-service kiosk computing platform 110 may identify a type of event or transaction, confirm that the processing entity is the first enterprise organization (e.g., the enterprise organization associated with the modified self-service kiosk 120), and the like.

At step 214, based on the requested type of transaction, the machine learning model may be updated and/or validated. For instance, if the requested type of transaction is one of the additional functions recommended by the machine learning model, or an offer generated by the machine learning model, the model may be validated to continuously improve quality of recommendations.

At step 215, universal self-service kiosk computing platform 110 may determine an entity to route the transaction to for processing and may connect to a computing system associated with the entity. For instance, if the requested transaction is a function generated by the machine learning model and offered by the entity operating the universal self-service kiosk computing platform 110 but not by the first enterprise organization, the universal self-service kiosk computing platform 110 may connect to an internal system and route the transaction to that internal system for processing. If the transaction will be processed by the first enterprise organization (e.g., based on transaction type, or the like), the universal self-service kiosk computing platform 110 may connect to external entity computing system 150 associated with the first enterprise organization to route the transaction to that system for processing. For instance, a second wireless connection may be established between universal self-service kiosk computing platform 110 and external entity computing system 150. Upon establishing the second wireless connection, a communication session may be initiated between universal self-service kiosk computing platform 110 and external entity computing system 150.

Figure 2D:
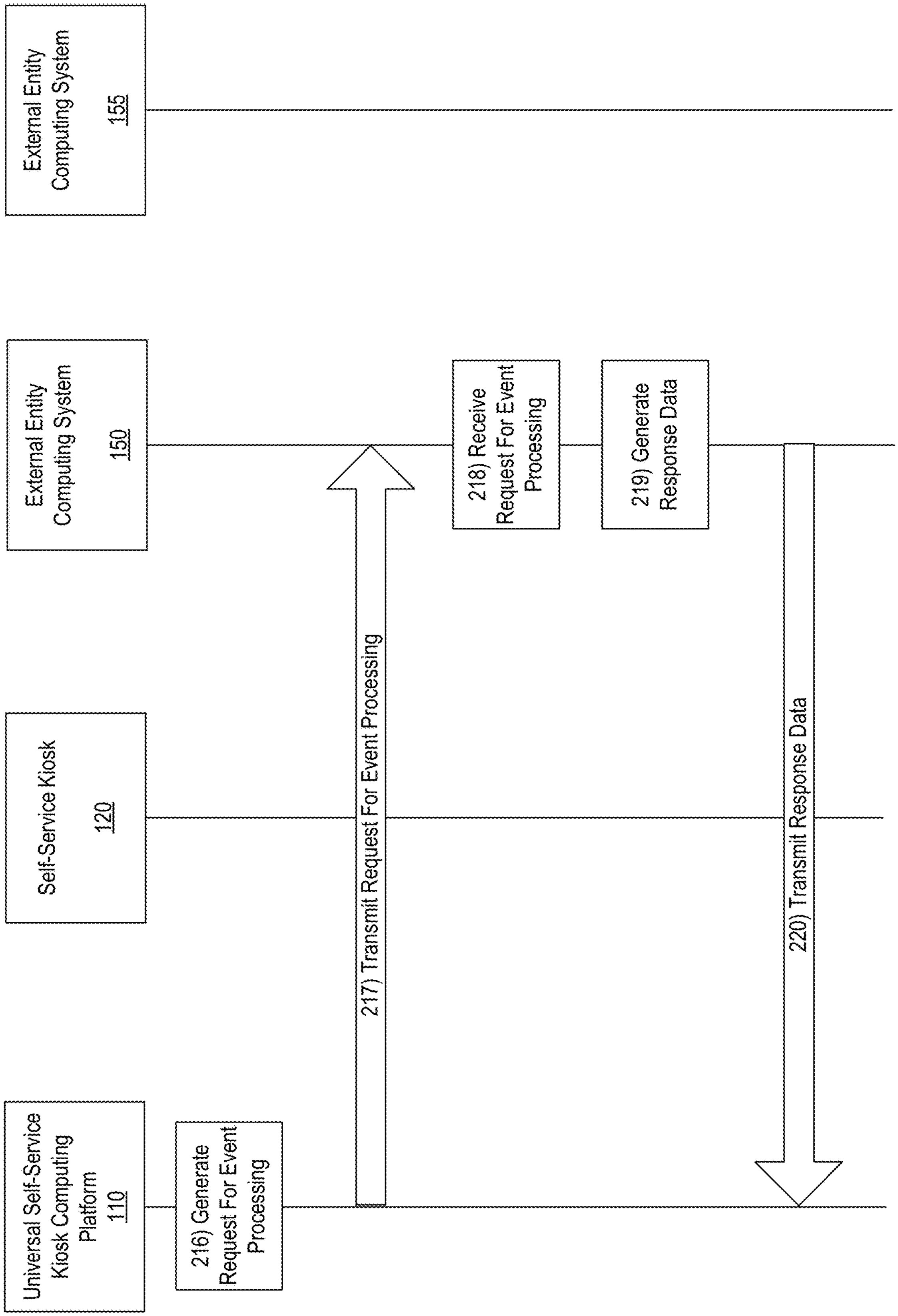

With reference to FIG. 2D, at step 216, universal self-service kiosk computing platform 110 may generate a request for event or transaction processing. For instance, the transaction data (e.g., type of transaction, amount of transaction, account associated with the transaction, and the like) may be used to generate a request to process the transaction.

At step 217, the universal self-service kiosk computing platform 110 may transmit or send the generated request for event or transaction processing to the external entity computing system 150. For instance, the request for event or transaction processing may be transmitted or sent during the communication session initiated upon establishing the second wireless connection.

At step 218, the external entity computing system 150 may receive and execute the request for event or transaction processing. For instance, the external entity computing system 150 may evaluate the request to confirm user authentication, funds are available, and the like.

At step 219, external entity computing system 150 may generate transaction or event response data. For instance, external entity computing system 150 may generate an indication or approval or denial of the requested event or transaction, instruction to dispense funds, or the like.

At step 220, external entity computing system 150 may transmit or send the transaction or event response data to the universal self-service kiosk computing platform 110.

Figure 2E:
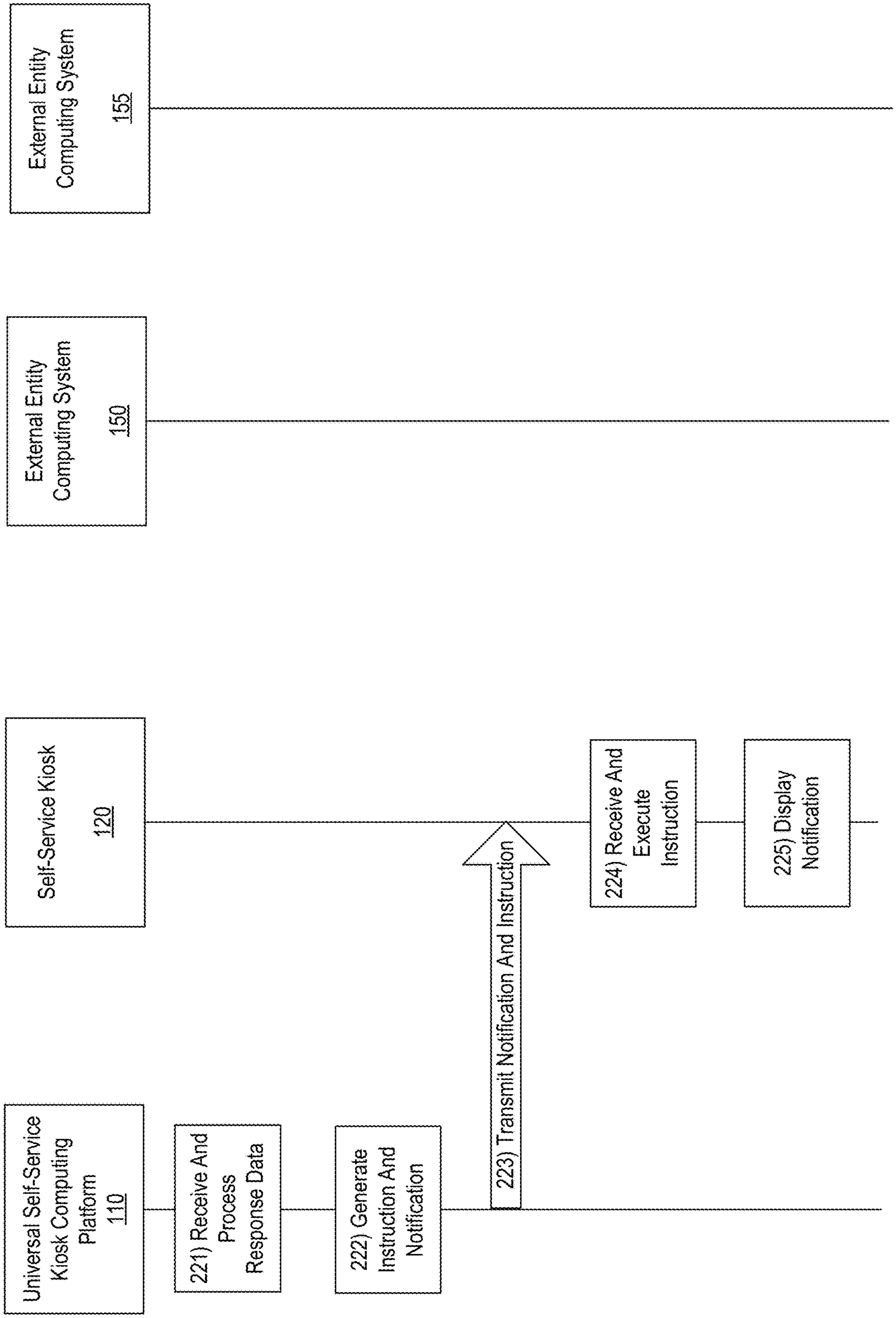

With reference to FIG. 2E, at step 221, the universal self-service kiosk computing platform 110 may receive and process the transaction or event response data. For instance, the universal self-service kiosk computing platform 110 may analyze the response data to determine whether the transaction was approved or denied, an amount of funds to dispense, or the like.

At step 222, universal self-service kiosk computing platform 110 may generate an instruction and notification causing the self-service kiosk to complete or process the requested transaction. For instance, an instruction that causes the self-service kiosk to execute processing of the transaction, dispensing of funds, or the like, may be generated. In some examples, a notification indicating approval or denial of the requested event or transaction may be generated.

At step 223, the generated instruction and notification may be transmitted by the universal self-service kiosk computing platform 110 to the self-service kiosk 120. In some examples, transmitting the notification and instruction may cause the self-service kiosk to execute the instruction and/or display the notification.

At step 224, self-service kiosk 120 may receive the instruction and execute the instruction, thereby processing the transaction to completion (e.g., dispensing funds, returning card, or the like, based on whether the transaction was approved or denied).

At step 225, self-service kiosk 120 may display any notification indicating approval or denial of the requested event or transaction.

Figure 2F:
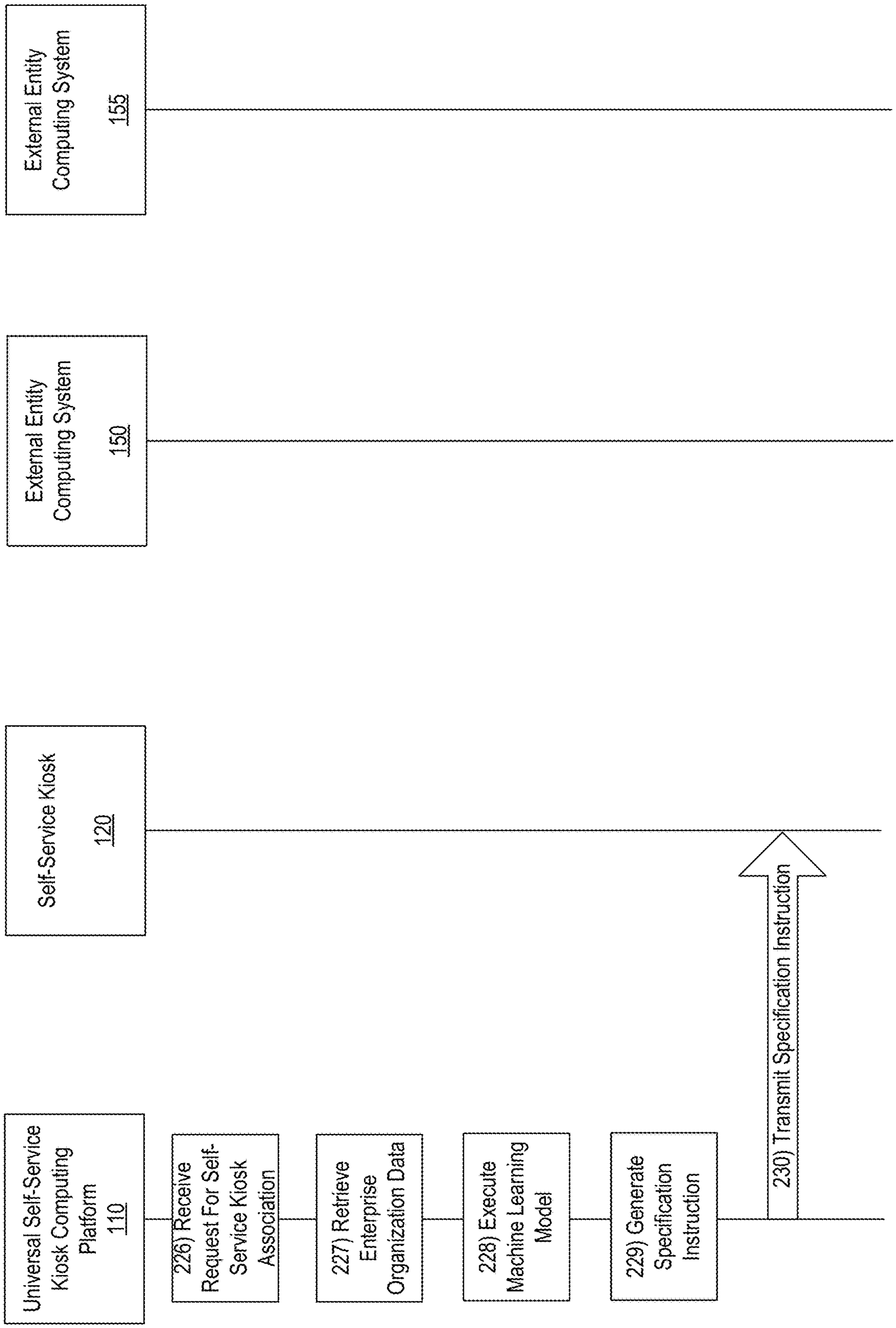

With reference to FIG. 2F, at step 226, universal self-service kiosk computing platform 110 may receive a subsequent request to associate one or more self-service kiosks with a second enterprise organization different from the enterprise organization implementing the universal self-service kiosk computing platform 110 (e.g., who may own or operate the self-service kiosk requested for association) and different from the first enterprise organization currently (or previously associated with the self-service kiosk 120). In some examples, the request may be received from a user of a self-service kiosk 120. The user may be prompted with a home screen to select the second enterprise organization to associate with the self-service kiosk (e.g., the user may select a financial institution at which the user has accounts). Additionally or alternatively, the second enterprise organization may request to associate with one or more self-service kiosks (e.g., a particular self-service kiosk, a group of self-service kiosks in a geographic area, or the like).

At step 227, universal self-service kiosk computing platform 110 may, based on the received request to associate the second enterprise organization with the self-service kiosk 120, retrieve specifications and/or configuration data associated with the second enterprise organization and stored by the universal self-service kiosk computing platform 110. The retrieved specifications and/or configurations may include functionality to offer, user interfaces to display, order of screens to present, or the like.

At step 228, universal self-service kiosk computing platform 110 may execute the machine learning model. For instance, universal self-service kiosk computing platform 110 may input, to the machine learning model, user data, location data of the self-service kiosk being associated, second enterprise organization data, publicly available entertainment event data (e.g., sporting events, concerts, theater performances, and the like) and, based on execution of the machine learning model, may output one or more recommended additional functions to offer to the user, one or more discounts or coupons, or the like.

At step 229, universal self-service kiosk computing platform 110 may generate an instruction causing the self-service kiosk 120 to modify display, functionality, and the like, according to the specifications and/or configuration associated with the second enterprise organization. In some examples, the instruction may include any recommended additional functions or offers output by the machine learning model.

At step 230, the generated instruction may be transmitted to the self-service kiosk 120.

Figure 2G:
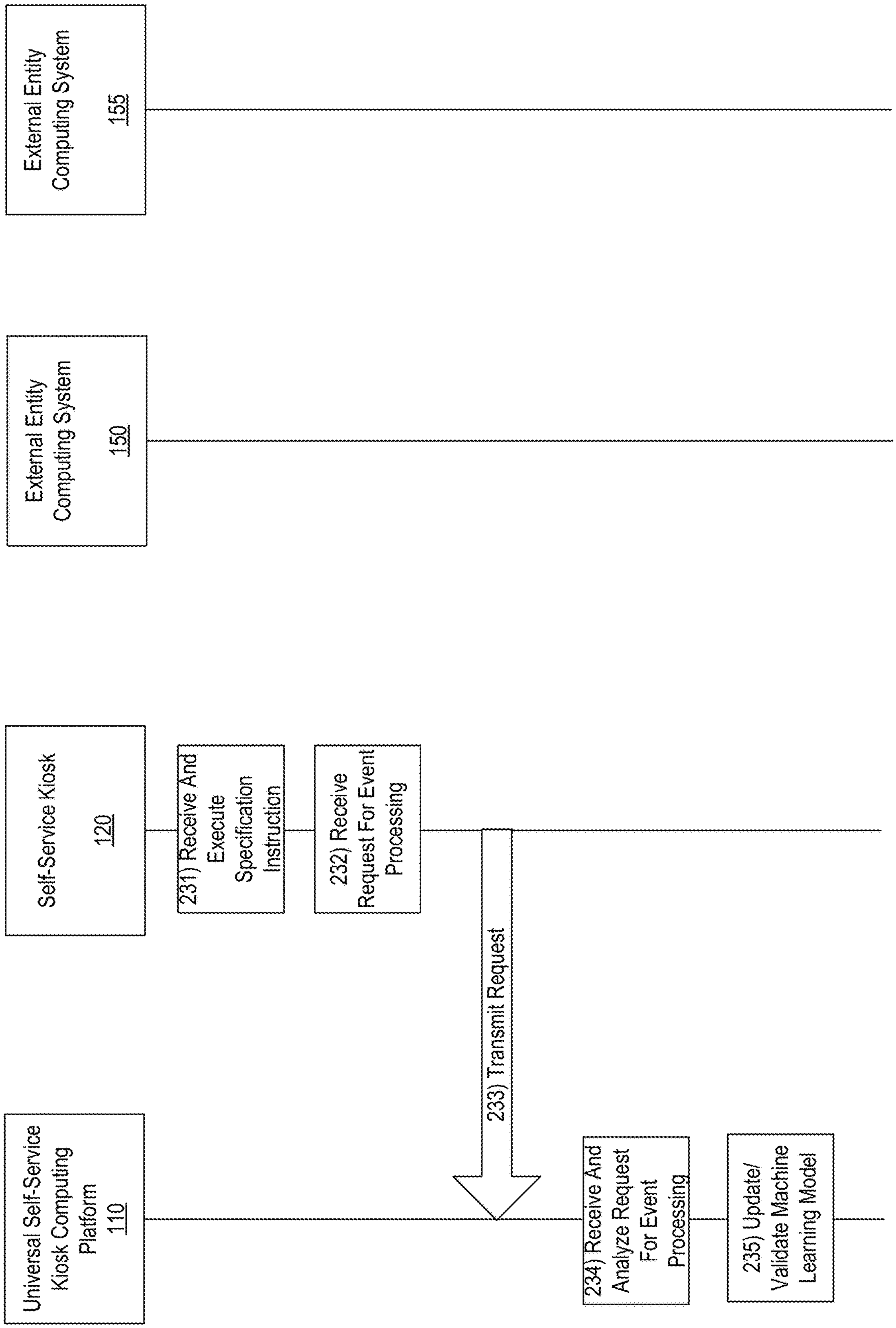
Figure 5:
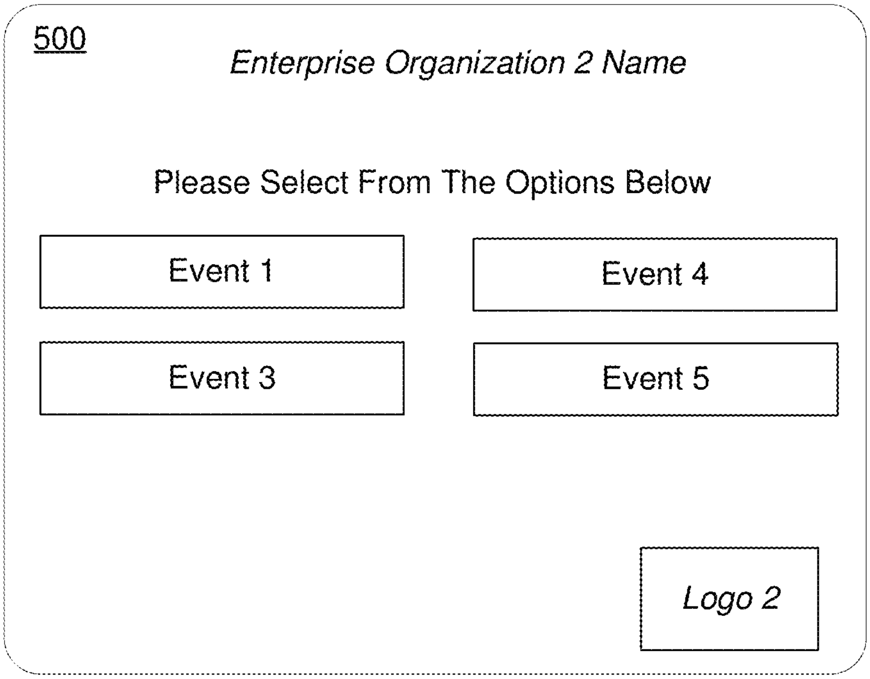

With reference to FIG. 2G, at step 231, self-service kiosk 120 may receive and execute the instruction. For instance, executing the instruction may cause the self-service kiosk to modify one or more displays, functionality offered, or the like. For instance, executing the instruction may cause the self-service kiosk to display a name of the first enterprise organization, a logo of the first enterprise organization, functionality offered by the first enterprise organization, and the like, based on the specifications and/or configurations of the first enterprise organization. FIG. 5 illustrates one example user interface 500 that may be displayed. The display may include some functionality also provided in FIG. 4 when the self-service kiosk was associated with the first enterprise organization (e.g., event 1, event 3) as well as additional functionality not provided in FIG. 4 (e.g., event 4, event 5). The logo and name of the second enterprise organization may be provided, as well as the layout may be modified based on specifications or configurations of the second enterprise organization.

In some examples, the additional functions and/or offers generated by the machine learning model may also be displayed or offered to a user upon execution of the instruction by the self-service kiosk. In some examples, the instruction may be automatically executed upon receipt by the self-service kiosk 120.

At step 232, self-service kiosk 120 may receive a request for event or transaction processing. For instance, a user may initiate a transaction at the self-service kiosk 120 that has been modified to be associated with the second enterprise organization.

At step 233, self-service kiosk 120 may transmit or send the request to process the transaction or event to the universal self-service kiosk computing platform 110. At step 234, universal self-service kiosk computing platform 110 may receive and process the requested event or transaction.

For instance, the universal self-service kiosk computing platform 110 may identify a type of event or transaction, confirm that the processing entity is the second enterprise organization (e.g., the enterprise organization associated with the modified self-service kiosk 120), and the like.

At step 235, based on the requested type of transaction, the machine learning model may be updated and/or validated. For instance, if the requested type of transaction is one of the additional functions recommended by the machine learning model, or an offer generated by the machine learning model, the model may be validated to continuously improve quality of recommendations.

Figure 2H:
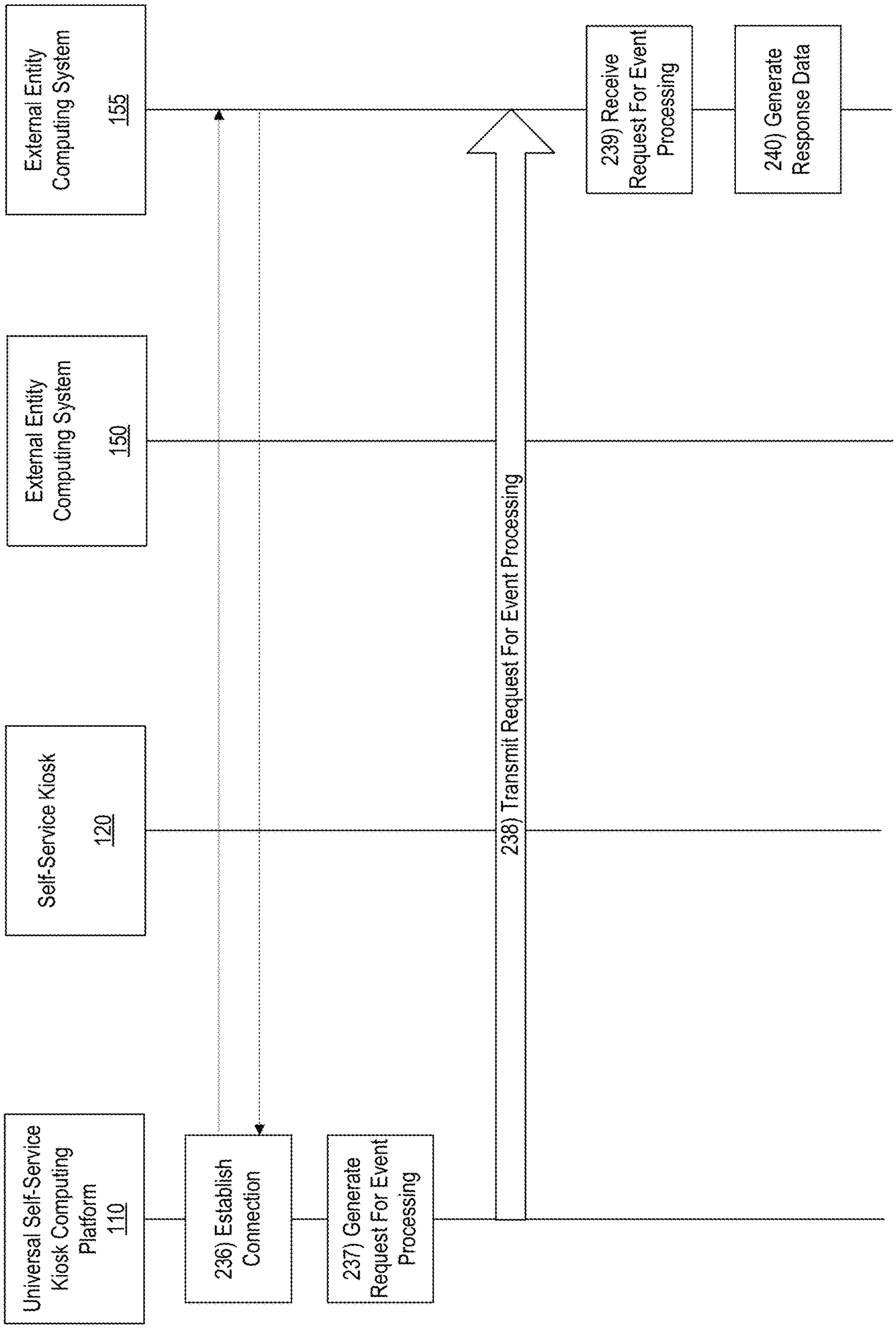

With reference to FIG. 2H, at step 236, universal self-service kiosk computing platform 110 may determine an entity to route the transaction to for processing and may connect to a computing system associated with the entity. For instance, if the requested transaction is a function generated by the machine learning model and offered by the entity operating the universal self-service kiosk computing platform 110 but not by the second enterprise organization, the universal self-service kiosk computing platform 110 may connect to an internal system and route the transaction to that internal system for processing. If the transaction will be processed by the second enterprise organization (e.g., based on transaction type, or the like), the universal self-service kiosk computing platform 110 may connect to external entity computing system 155 associated with the second enterprise organization to route the transaction to that system for processing. For instance, a third wireless connection may be established between universal self-service kiosk computing platform 110 and external entity computing system 155. Upon establishing the third wireless connection, a communication session may be initiated between universal self-service kiosk computing platform 110 and external entity computing system 155.

At step 237, universal self-service kiosk computing platform 110 may generate a request for event or transaction processing. For instance, the transaction data (e.g., type of transaction, amount of transaction, account associated with the transaction, and the like) may be used to generate a request to process the transaction.

At step 238, the universal self-service kiosk computing platform 110 may transmit or send the generated request for event or transaction processing to the external entity computing system 155. For instance, the request for event or transaction processing may be transmitted or sent during the communication session initiated upon establishing the third wireless connection.

At step 239, the external entity computing system 155 may receive and execute the request for event or transaction processing. For instance, the external entity computing system 155 may evaluate the request to confirm user authentication, funds are available, and the like.

At step 240, external entity computing system 155 may generate transaction or event response data. For instance, external entity computing system 155 may generate an indication or approval or denial of the requested event or transaction, instruction to dispense funds, or the like.

Figure 2I:
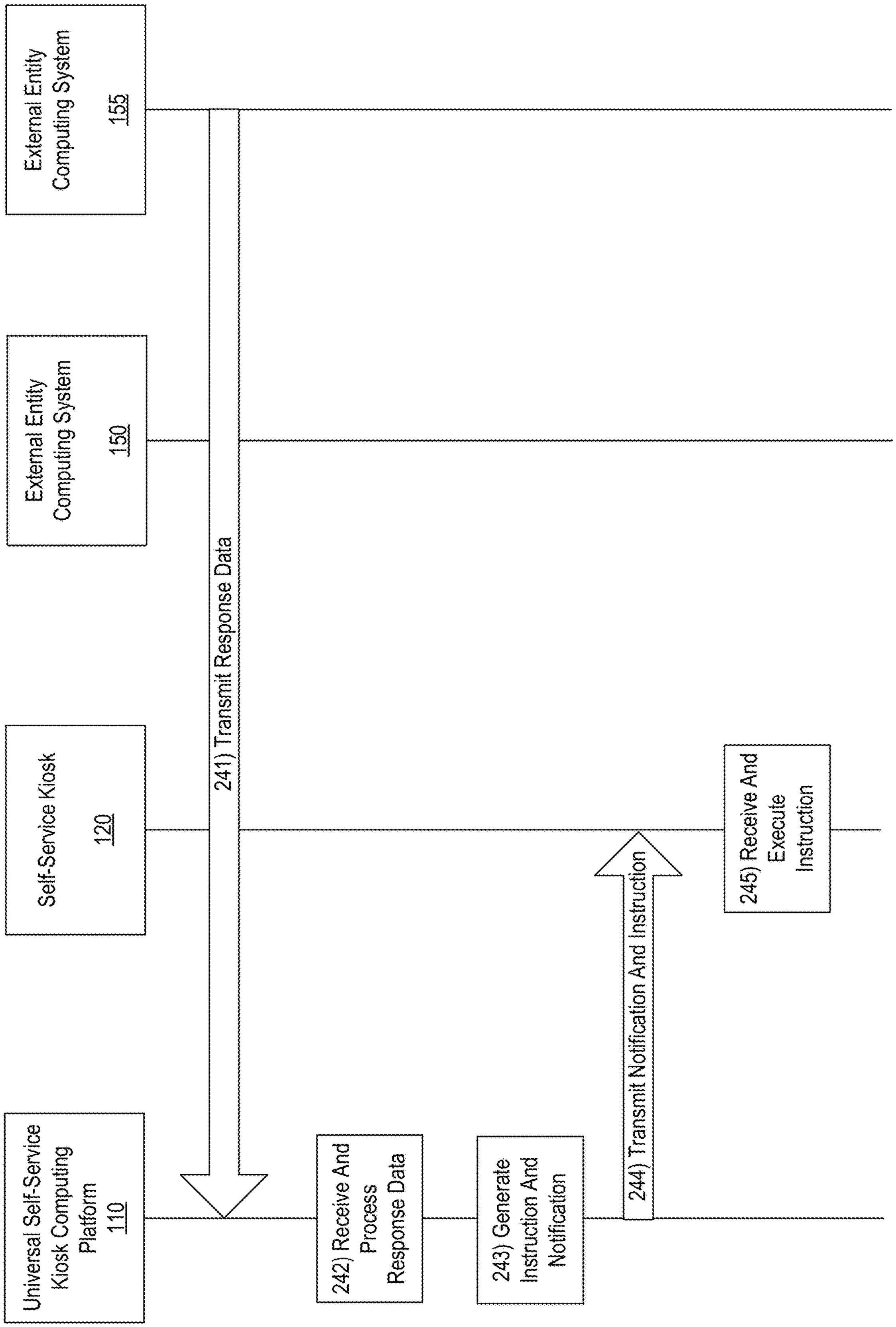

With reference to FIG. 2I, at step 241, external entity computing system 155 may transmit or send the transaction or event response data to the universal self-service kiosk computing platform 110.

At step 242, the universal self-service kiosk computing platform 110 may receive and process the transaction or event response data. For instance, the universal self-service kiosk computing platform 110 may analyze the response data to determine whether the transaction was approved or denied, an amount of funds to dispense, or the like.

At step 243, universal self-service kiosk computing platform 110 may generate an instruction and notification causing the self-service kiosk to complete or process the requested transaction. For instance, an instruction that causes the self-service kiosk to execute processing of the transaction, dispensing of funds, or the like, may be generated. In some examples, a notification indicating approval or denial of the requested event or transaction may be generated.

At step 244, the generated instruction and notification may be transmitted by the universal self-service kiosk computing platform 110 to the self-service kiosk 120. In some examples, transmitting the notification and instruction may cause the self-service kiosk to execute the instruction and/or display the notification.

At step 245, self-service kiosk 120 may receive the instruction and execute the instruction, thereby processing the transaction to completion (e.g., dispensing funds, returning card, or the like, based on whether the transaction was approved or denied).

Figure 2J:
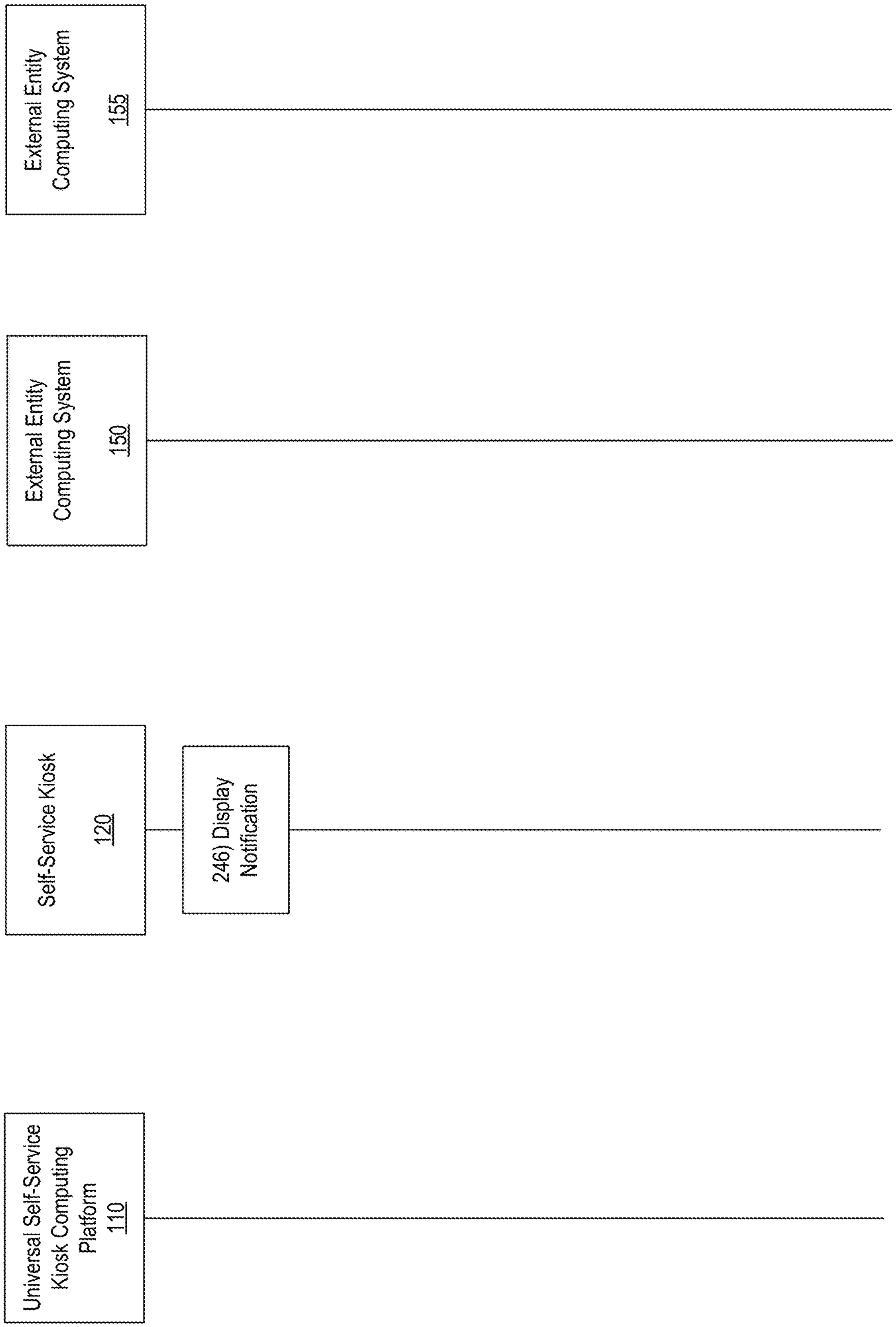

With reference to FIG. 2J, at step 246, self-service kiosk 120 may display any notification indicating approval or denial of the requested event or transaction.

Figure 3:
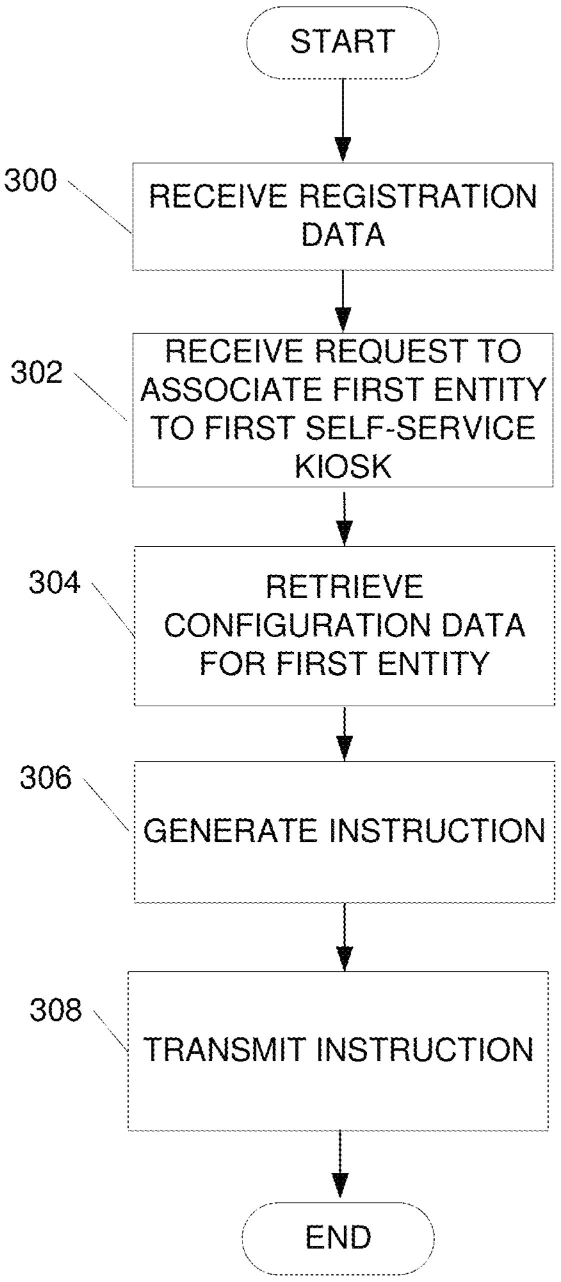
FIG. 3 depicts an illustrative method for implementing self-service kiosk functions in accordance with one or more aspects described herein.

FIG. 3 is a flow chart illustrating one example method of implementing universal self-service kiosk functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as universal self-service kiosk computing platform 110, may receive registration data from a plurality of enterprise organizations. The registration data may include identifying information of each enterprise organization, as well as self-service kiosk specifications or configurations associated with each enterprise organization. The specifications or configurations may include user interfaces to display on a self-service kiosk, functionality to offer to users, and the like. In some examples, the registration data may be stored by the universal self-service kiosk computing platform 110.

At step 302, the universal self-service kiosk computing platform 110 may receive a request associate at least a first self-service kiosk with a first enterprise organization. The request may be received from the first enterprise organization or from a user using the first self-service kiosk. In some examples, the first enterprise organization may be a different enterprise organization from the enterprise organization or entity implementing the universal self-service kiosk computing platform 110 who may, in some examples, own, operate or maintain the first self-service kiosk, as well as other self-service kiosks. In some arrangements, the request may include identification of the first enterprise organization, as well as identification of the first self-service kiosk.

At step 304, the universal self-service kiosk computing platform 110 may retrieve, based on the request to associate the first self-service kiosk with the first enterprise organization, a self-service kiosk configuration associated with the first enterprise organization. For instance, the universal self-service kiosk computing platform 110 may retrieve, based on information identifying the first enterprise organization, a self-service kiosk configuration received and stored with the registration data for or associated with the first enterprise organization and may retrieve that self-service kiosk configuration.

At step 306, the universal self-service kiosk computing platform 110 may generate an instruction causing the first self-service kiosk to execute or implement the self-service kiosk configuration associated with the first enterprise organization.

At step 308, the universal self-service kiosk computing platform may transmit, to the first self-service kiosk, the instructing causing the first self-service kiosk to execute or implement the self-service kiosk configuration associated with the first enterprise organization. In some examples, transmitting the instruction may cause the first self-service kiosk to modify one or more displays or functionality provided. For instance, transmitting the instruction may cause the first self-service kiosk to display information identifying the first enterprise organization as associated with the first self-service kiosk and provide functionality identified by the first enterprise organization and included in the self-service kiosk configuration associated with the first enterprise organization.

As discussed above, arrangements described herein provide for a universal self-service kiosk platform configured to control branding or association of one or more self-service kiosks, including user interfaces displayed, data displayed, functionality offered, and the like. In some arrangements, aspects described herein may be implemented in a cloud computing environment to enable efficient access to data associated with a plurality of enterprise organizations.

Aspects described herein further include a machine learning engine for intelligent recommendation generation. For instance, machine learning may be used to generate functionality that might not be provided by the enterprise organization currently associated with the self-service kiosk but provided by the enterprise organization implementing the universal self-service kiosk platform and who owns, maintains and/or otherwise controls the self-service kiosk. Accordingly, functionality provided or offered to users may be flexible and machine learning may be used to identify additional functionality that may be of interest to a user. For instance, functions like wire transfers that are not typically offered at a self-service kiosk and may not be offered by some enterprise organizations, may, based on the machine learning engine, be identified as a function to offer to users via the associated self-service kiosk. In another example, foreign currency conversion may also be provided as an example additional functionality. Accordingly, users may be provided functionality they would not normally be provided. In some examples, users may request or opt-in to receive generated recommendations.

Although various aspects are described in the context of transactions that may occur at, for instance, an ATM, aspects described herein may be used to provide functionality for various retailers, vendors, and the like. For instance, the machine learning model may generate offers for users (e.g., discounts, coupons, or the like) to use at retailers within a predefined distance of the self-service kiosk. In some examples, the discount or offer may be provided as an additional functional option for selection, may be printed on a receipt, may include a QR code displayed on the self-service kiosk screen for scanning, or the like. Additionally or alternatively, recommendations may be generated and provided to a user to contribute to local non-profit or charitable donations, participate in a local small business day, or the like. A selectable option may be provided to a user on the self-service kiosk and the user may make a donation directly from the self-service kiosk.

Further, arrangements described herein may be used to monitor status of a self-service kiosk to understand when service may be needed, type of service, and the like. Accordingly, service calls may be more efficiently scheduled and executed.

As discussed herein, an enterprise organization may request association with a single self-service kiosk or a plurality of self-service kiosks. In some examples, the plurality of self-service kiosks may be in a geographic area, may be within a predefined distance or radius of a venue (e.g., a sporting arena, theater, or the like), or the like. In some examples, an enterprise organization may, based on publicly available event information, request association with self-service kiosk near a venue for a particular period of time (e.g., two hours before an event at the nearby venue, or the like).

In some examples, aspects described herein may provide enterprise organizations an opportunity to share the costs of operating the self-service kiosk. For instance, cash suppliers may be consolidated or fewer vendors used to stock or fill the self-service kiosks. Further, by re-associating or rebranding the self-service kiosk to appear as if owned by an enterprise organization, the organization may have the opportunity to operate in geographic areas they are not currently located in. Accordingly, the arrangements described herein may establish trusted partner relationships between vendors, enterprise organizations, retailers, and the like.

Figure 6:
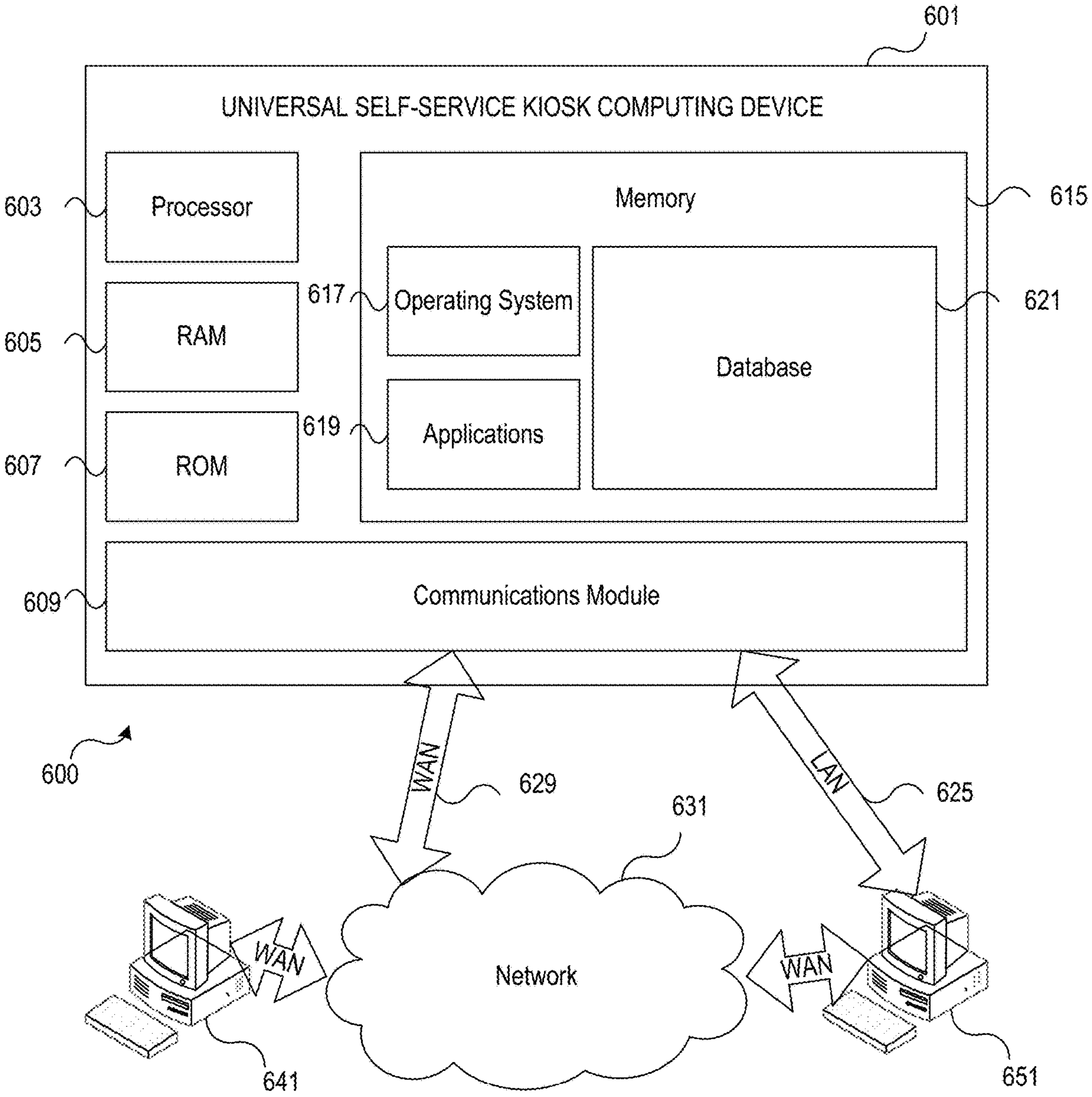
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include universal self-service kiosk computing device 601 having processor 603 for controlling overall operation of universal self-service kiosk computing device 601 and its associated components, including Random Access Memory (RAM) 605, Read-Only Memory (ROM) 607, communications module 609, and memory 615. Universal self-service kiosk computing device 601 may include a variety of computer readable media. Computer readable media may be any available media that may be accessed by universal self-service kiosk computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by universal self-service kiosk computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on universal self-service kiosk computing device 601. Such a processor may execute computer-executable instructions stored on a computer-readable medium.

Software may be stored within memory 615 and/or storage to provide instructions to processor 603 for enabling universal self-service kiosk computing device 601 to perform various functions as discussed herein. For example, memory 615 may store software used by universal self-service kiosk computing device 601, such as operating system 617, application programs 619, and associated database 621. Also, some or all of the computer executable instructions for universal self-service kiosk computing device 601 may be embodied in hardware or firmware. Although not shown, RAM 605 may include one or more applications representing the application data stored in RAM 605 while universal self-service kiosk computing device 601 is on and corresponding software applications (e.g., software tasks) are running on universal self-service kiosk computing device 601.

Communications module 609 may include a microphone, keypad, touch screen, and/or stylus through which a user of universal self-service kiosk computing device 601 may provide input, and may also include one or more of a speaker for providing audio output and a video display device for providing textual, audiovisual and/or graphical output. Computing system environment 600 may also include optical scanners (not shown).

Universal self-service kiosk computing device 601 may operate in a networked environment supporting connections to one or more remote computing devices, such as computing device 641 and 651. Computing devices 641 and 651 may be personal computing devices or servers that include any or all of the elements described above relative to universal self-service kiosk computing device 601.

The network connections depicted in FIG. 6 may include Local Area Network (LAN) 625 and Wide Area Network (WAN) 629, as well as other networks. When used in a LAN networking environment, universal self-service kiosk computing device 601 may be connected to LAN 625 through a network interface or adapter in communications module 609. When used in a WAN networking environment, universal self-service kiosk computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive, from a first financial institution, a request to associate a plurality of automated teller machines (ATM) with the first financial institution for a predefined time period, wherein the plurality of ATMs are associated with a second, different financial institution, wherein the request to associate the plurality of ATMs includes information identifying the first financial institution and the plurality of ATMs and wherein the plurality of ATMs are located within a predefined distance of an event location;

retrieve, based on the information identifying the first financial institution, an ATM configuration associated with the first financial institution;

execute, using location data associated with the plurality of ATMs, a machine learning model to output one or more ATM functions to provide;

initiate a communication session with the plurality of ATMs;

generate an instruction causing the plurality of ATMs to execute the ATM configuration associated with the first financial institution and provide the one or more ATM functions based on the machine learning model;

transmit, to the plurality of ATMs within the predefined distance of the event location, the instruction causing the plurality of ATMs to execute the ATM configuration associated with the first financial institution, wherein transmitting the instruction causes the plurality of ATMs to display information identifying the first financial institution and provide functionality identified by the first financial institution and included in the ATM configuration associated with the first financial institution, wherein the functionality identified by the first financial institution includes functionality associated with receiving and dispensing funds and wherein the display information further includes the one or more ATM functions output by the machine learning model;

determine that the predefined time period has elapsed; and responsive to determining that the predefined time period has elapsed, transmit, to the plurality of ATMs within the predefined distance of the event location, an instruction causing the plurality of ATMs to execute an ATM configuration associated with the second financial institution, wherein transmitting the instruction causes the plurality of ATMs to display information identifying the second financial institution and provide functionality identified by the second financial institution and included in the ATM configuration associated with the second financial institution.

2. The computing platform of claim 1, wherein the ATM configuration associated with the first financial institution further includes one or more user interfaces for display.

3. The computing platform of claim 1, further including instructions that, when executed, cause the at least one processor to:

receive registration data from a plurality of financial institutions including at least the first financial institution, the registration data including ATM configurations for each financial institution of the plurality of financial institutions; and store the registration data.

4. The computing platform of claim 1, wherein the first financial institution is different from the second financial institution implementing the computing platform and that maintains the plurality of ATMs.

5. The computing platform of claim 1, further including instructions that, when executed, cause the computing platform to:

receive, from a first ATM of the plurality of ATMs, a user request to process a transaction;

initiate a communication session with a computing system of the first financial institution;

transmit the request to process the transaction to the computing system of the first financial institution for processing;

receive, from the computing system of the first financial institution, response data indicating whether the request to process the transaction was approved;

generate an instruction based on the response data; and transmit the generated instruction to the first ATM, wherein transmitting the generated instruction to the first ATM causes the first ATM to approve or deny the request to process the transaction.

6. The computing platform of claim 1, further including instructions that, when executed by the at least one processor, cause the computing platform to:

generate, based on execution of the machine learning model, at least one recommendation, wherein transmitting to the plurality of ATMs, the instruction causing the plurality of ATMs to execute the ATM configuration associated with the first financial institution, further includes transmitting, to the plurality of ATMs, the generated at least one recommendation, and wherein transmitting the generated at least one recommendation causes the plurality of ATMs to display the generated at least one recommendation.

7. The computing platform of claim 1, further including instructions that, when executed by the at least one processor, cause the computing platform to:

after transmitting, to the plurality of ATMs, the instruction causing the plurality of ATMs to execute the ATM configuration associated with the first financial institution:

receive, from a third financial institution different from the first financial institution and second financial institution, a third financial institution, wherein the request to associate the at least the first ATM includes information identifying the third financial institution and the at least the first ATM;

retrieve, based on the information identifying the third financial institution, an ATM configuration associated with the third financial institution;

generate an instruction causing the at least the first ATM of the plurality of ATMs to execute the ATM configuration associated with the third financial institution; and transmit, to the at least the first ATM, the instruction causing the at least the first ATM to execute the ATM configuration associated with the third financial institution, wherein transmitting the instruction causes the at least the first ATM to display information identifying the third financial institution and provide functionality identified by the third financial institution and included in the ATM configuration associated with the third financial institution.

8. A method, comprising:

receiving, by a computing platform, the computing platform having at least one processor and memory, and from a first financial institution, a request to associate a plurality of automated teller machines (ATM) with the first financial institution for a predefined time period, wherein the plurality of ATMs are associated with a second, different financial institution, wherein the request to associate the plurality of ATMs includes information identifying the first financial institution and the plurality of ATMs and wherein the plurality of ATMs are located within a predefined distance of an event location;

retrieving, by the at least one processor and based on the information identifying the first financial institution, an ATM configuration associated with the first financial institution;

executing, by the at least one processor and using location data associated with the plurality of ATMs, a machine learning model to output one or more ATM functions to provide;

initiating, by the at least one processor, a communication session with the plurality of ATMs;

generating, by the at least one processor, an instruction causing the plurality of ATMs to execute the ATM configuration associated with the first financial institution and provide the one or more ATM functions based on the machine learning model;

transmitting, by the at least one processor and to the plurality of ATMs, the instruction causing the plurality of ATMs to execute the ATM configuration associated with the first financial institution, wherein transmitting the instruction causes the plurality of ATMs to display information identifying the first financial institution and provide functionality identified by the first financial institution and included in the ATM configuration associated with the first financial institution, wherein the functionality identified by the first financial institution includes functionality associated with receiving and dispensing funds and wherein the display information further includes the one or more ATM functions output by the machine learning model;

determining, by the at least one processor, that the predefined time period has elapsed; and responsive to determining that the predefined time period has elapsed, transmitting, by the at least one processor and to the plurality of ATMs within the predefined distance of the event location, an instruction causing the plurality of ATMs to execute an ATM configuration associated with the second financial institution, wherein transmitting the instruction causes the plurality of ATMs to display information identifying the second financial institution and provide functionality identified by the second financial institution and included in the ATM configuration associated with the second financial institution.

9. The method of claim 8, further including:

receiving, by the at least one processor, registration data from a plurality of financial institution including at least the first financial institution, the registration data including ATM configurations for each financial institution of the plurality of financial institution; and storing the registration data.

10. The method of claim 8, wherein the first financial institution is different from the second financial institution implementing the computing platform and that maintains the plurality of ATMs.

11. The method of claim 8, further including:

receiving, by the at least one processor and from a first ATM of the plurality of ATMs, a user request to process a transaction;

initiating, by the at least one processor, a communication session with a computing system of the first financial institution;

transmitting, by the at least one processor, the request to process the transaction to the computing system of the first financial institution for processing;

receiving, by the at least one processor and from the computing system of the first financial institution, response data indicating whether the request to process the transaction was approved;

generating, by the at least one processor, an instruction based on the response data; and transmitting, by the at least one processor, the generated instruction to the first ATM, wherein transmitting the generated instruction to the first ATM causes the first ATM to approve or deny the request to process the transaction.

12. The method of claim 8, further including:

generating, by the at least one processor and based on execution of the machine learning model, at least one recommendation, wherein transmitting to the plurality of ATMs, the instruction causing the plurality of ATMs to execute the ATM configuration associated with the first financial institution, further includes transmitting, to the plurality of ATMs, the generated at least one recommendation, and wherein transmitting the generated at least one recommendation causes the plurality of ATMs to display the generated at least one recommendation.

13. The method of claim 8, further including:

after transmitting, to the plurality of ATMs, the instruction causing the plurality of ATMs to execute the ATM configuration associated with the first financial institution:

receiving, by the at least one processor and from a third financial institution different from the first financial institution and the second financial institution, a request to associate at least a first ATM with the third financial institution, wherein the request to associate the at least the first ATM includes information identifying the third financial institution and the at least the first ATM;

retrieving, by the at least one processor and based on the information identifying the third financial institution, an ATM configuration associated with the third financial institution;

generating, by the at least one processor, an instruction causing the at least the first ATM to execute the ATM configuration associated with the third financial institution; and transmitting, by the at least one processor and to the at least the first ATM, the instruction causing the at least the first ATM to execute the ATM configuration associated with the third financial institution, wherein transmitting the instruction causes the at least the first ATM to display information identifying the third financial institution and provide functionality identified by the third financial institution and included in the ATM configuration associated with the third financial institution.

14. One or more non-transitory computer-readable media storing instructions that, when executed by a computing platform comprising at least one processor, memory, and a communication interface, cause the computing platform to:

receive, from a first financial institution, a request to associate a plurality of automated teller machines (ATM) with the first financial institution for a predefined time period, wherein the plurality of ATMs are associated with a second, different financial institution, wherein the request to associate the plurality of ATMs includes information identifying the first financial institution and the plurality of ATMs and wherein the plurality of ATMs are located within a predefined distance of an event location;

retrieve, based on the information identifying the first financial institution, an ATM configuration associated with the first financial institution;

execute, using location data associated with the plurality of ATMs, a machine learning model to output one or more ATM functions to provide;

initiate a communication session with the plurality of ATMs;

generate an instruction causing the plurality of ATMs to execute the ATM configuration associated with the first financial institution and provide the one or more ATM functions based on the machine learning model;

transmit, to the plurality of ATMs, the instruction causing the plurality of ATMs to execute the ATM configuration associated with the first financial institution, wherein transmitting the instruction causes the plurality of ATMs to display information identifying the first financial institution and provide functionality identified by the first financial institution and included in the ATM configuration associated with the first financial institution, wherein the functionality identified by the first financial institution includes functionality associated with receiving and dispensing funds and wherein the display information further includes the one or more ATM functions output by the machine learning model;

determine that the predefined time period has elapsed; and responsive to determining that the predefined time period has elapsed, transmit, to the plurality of ATMs within the predefined distance of the event location, an instruction causing the plurality of ATMs to execute an ATM configuration associated with the second financial institution, wherein transmitting the instruction causes the plurality of ATMs to display information identifying the second financial institution and provide functionality identified by the second financial institution and included in the ATM configuration associated with the second financial institution.

15. The one or more non-transitory computer-readable media of claim 14, wherein the ATM configuration associated with the first financial institution further includes one or more user interfaces for display.

16. The one or more non-transitory computer-readable media of claim 14, further including instructions that, when executed, cause the at least one processor to:

receive registration data from a plurality of financial institutions including at least the first financial institution, the registration data including ATM configurations for each financial institution of the plurality of financial institutions; and store the registration data.

17. The one or more non-transitory computer-readable media of claim 14, wherein the first financial institution is different from the second financial institution implementing the computing platform and that maintains the plurality of ATMs.

18. The one or more non-transitory computer-readable media of claim 14, further including instructions that, when executed, cause the computing platform to:

receive, from a first ATM of the plurality of ATMs, a user request to process a transaction;

initiate a communication session with a computing system of the first financial institution;

transmit the request to process the transaction to the computing system of the first financial institution for processing;

receive, from the computing system of the first financial institution, response data indicating whether the request to process the transaction was approved;

generate an instruction based on the response data; and transmit the generated instruction to the first ATM, wherein transmitting the generated instruction to the first ATM causes the first ATM to approve or deny the request to process the transaction.

19. The one or more non-transitory computer-readable media of claim 14, further including instructions that, when executed by the at least one processor, cause the computing platform to:

generate, based on execution of the machine learning model, at least one recommendation, wherein transmitting to the plurality of ATMs, the instruction causing the plurality of ATMs to execute the ATM configuration associated with the first financial institution, further includes transmitting, to the plurality of ATMs, the generated at least one recommendation, and wherein transmitting the generated at least one recommendation causes the plurality of ATMs to display the generated at least one recommendation.

20. The one or more non-transitory computer-readable media of claim 14, further including instructions that, when executed by the at least one processor, cause the computing platform to:

after transmitting, to the plurality of ATMs, the instruction causing the plurality of ATMs to execute the ATM configuration associated with the first financial institution:

receive, from a third financial institution different from the first financial institution and second financial institution, a request to associate at least a first ATM with the third financial institution, wherein the request to associate the at least the first ATM includes information identifying the third financial institution and the at least the first ATM;

retrieve, based on the information identifying the third financial institution, an ATM configuration associated with the third financial institution;

generate an instruction causing the at least the first ATM of the plurality of ATMs to execute the ATM configuration associated with the third financial institution; and transmit, to the at least the first ATM, the instruction causing the at least the first ATM to execute the ATM configuration associated with the third financial institution, wherein transmitting the instruction causes the at least the first ATM to display information identifying the third financial institution and provide functionality identified by the third financial institution and included in the ATM configuration associated with the third financial institution.

21. The computing platform of claim 1, wherein the predefined time period is measured from a time associated with an event occurring at the event location.

* * * * *